US010291140B2

(12) United States Patent
Jitaru

(10) Patent No.: US 10,291,140 B2
(45) Date of Patent: May 14, 2019

(54) PHASE-SHIFTED FULL-BRIDGE TOPOLOGY WITH CURRENT INJECTION

(71) Applicant: ROMPOWER ENERGY SYSTEMS INC., Tucson, AZ (US)

(72) Inventor: Ionel Jitaru, Tucson, AZ (US)

(*) Notice: Subject to any disclaimer, the term of this patent is extended or adjusted under 35 U.S.C. 154(b) by 0 days.

(21) Appl. No.: 15/987,499

(22) Filed: May 23, 2018

(65) Prior Publication Data

US 2018/0278169 A1 Sep. 27, 2018

Related U.S. Application Data

(63) Continuation-in-part of application No. 15/068,598, filed on Mar. 13, 2016, now Pat. No. 9,985,546, (Continued)

(51) Int. Cl.
*H02M 3/335* (2006.01)
*H02M 7/5387* (2007.01)
(Continued)

(52) U.S. Cl.
CPC ..... *H02M 3/33592* (2013.01); *H02M 1/584* (2013.01); *H02M 3/3374* (2013.01); *H02M 3/33576* (2013.01); *H02M 7/5387* (2013.01); *H02M 2001/0058* (2013.01); *H02M 2003/1552* (2013.01); *H02M 2003/1586* (2013.01); *Y02B 70/1433* (2013.01); *Y02B 70/1475* (2013.01); *Y02B 70/1491* (2013.01)

(58) Field of Classification Search
CPC . H02M 2007/4818; H02M 2007/4815; H02M 3/33538; H02M 3/33546; H02M 3/33515; H02M 3/33576; H02M 3/33553; H02M 3/33507; H02M 3/33592; H02M 3/33523; H02M 3/3353; H02M 3/33569; H02M 7/5387; H02M 2001/0058; H02M 2003/1586; H02M 2003/1552; Y02B 70/1433; Y02B 70/1475; Y02B 70/1491
USPC .................. 363/21.02, 21.03, 15–17, 97–98
See application file for complete search history.

(56) References Cited

U.S. PATENT DOCUMENTS

2002/0001203 A1* 1/2002 Jitaru .................. H02M 3/3376
363/17
2002/0044469 A1 4/2002 Yasumura
(Continued)

FOREIGN PATENT DOCUMENTS

WO 20140183103 A1 11/2014

OTHER PUBLICATIONS

Extended European Search Report issued by the European Patent Office in related European Application No. 16765528.1, dated Sep. 26, 2018, 9 pages.

*Primary Examiner* — Bryan R Perez
(74) *Attorney, Agent, or Firm* — Yakov S. Sidorin; Quarles & Brady LLP

(57) ABSTRACT

Methods for operation of a phase-shifted full-bridge topology power converter in a true soft-switching mode, regardless of the value of the leakage inductance of the converter. To achieve this, a process of discharge of the parasitic capacitances across the switching elements from a part of the resonant leg starts after the entire, total energy in the leakage inductance is used, and the voltage across the primary switching elements reaches the specific lower level.

20 Claims, 18 Drawing Sheets

Related U.S. Application Data which is a continuation-in-part of application No. 14/274,701, filed on May 10, 2014, now Pat. No. 10,103,639, said application No. 15/987,499 is a continuation-in-part of application No. 15/899,243, filed on Feb. 19, 2018, now Pat. No. 10,050,545, which is a continuation-in-part of application No. 14/890,088, filed as application No. PCT/US2014/037736 on May 12, 2014, now Pat. No. 9,899,929, said application No. 15/987,499 is a continuation-in-part of application No. 14/796,204, filed on Jul. 10, 2015, now Pat. No. 10,205,397, and a continuation-in-part of application No. 15/825,647, filed on Nov. 29, 2017.

(60) Provisional application No. 62/133,245, filed on Mar. 13, 2015, provisional application No. 61/821,896, filed on May 10, 2013, provisional application No. 61/821,902, filed on May 10, 2013, provisional application No. 62/023,025, filed on Jul. 10, 2014, provisional application No. 62/587,816, filed on Nov. 17, 2017.

(51) Int. Cl.
*H02M 3/158* (2006.01)
*H02M 3/337* (2006.01)
*H02M 1/00* (2006.01)
*H02M 3/155* (2006.01)

(56) References Cited

U.S. PATENT DOCUMENTS

| | | |
|---|---|---|
| 2005/0036340 A1 | 2/2005 | Scarlatescu |
| 2005/0226009 A1 | 10/2005 | Jitaru |
| 2006/0279966 A1 | 12/2006 | Fan et al. |
| 2007/0230228 A1 | 10/2007 | Mao |
| 2011/0013424 A1 | 1/2011 | Chih-Liang et al. |
| 2012/0147629 A1* | 6/2012 | Mao ............... H02M 3/28 363/17 |
| 2016/0020701 A1 | 1/2016 | Jitaru |
| 2016/0094137 A1 | 3/2016 | Jitaru et al. |
| 2018/0198374 A1 | 7/2018 | Jitaru |

\* cited by examiner

*Voltage across the synchronized rectifiers with "True Soft Switching" technology*

*Voltage across the synchronized rectifiers with Hard Switching*

PHASE-SHIFTED FULL-BRIDGE TOPOLOGY WITH CURRENT INJECTION

CROSS-REFERENCE TO RELATED APPLICATIONS

This patent application is a continuation-in-part from the U.S. patent application Ser. No. 15/068,598 filed on Mar. 13, 2016, now published as US 2017/0012547, which claims priority from the U.S. Provisional Patent Application No. 62/133,245 filed on Mar. 13, 2015.

This patent application is also a continuation-in-part from the U.S. patent application Ser. No. 14/274,701 filed on May 10, 2014, and now published as US 2014/0334188, which claims priority from U.S. Provisional application No. 61/821,896 filed on May 10, 2013.

This patent application is also a continuation-in-part from the U.S. patent application Ser. No. 15/899,243, filed on Feb. 19, 2018, which is a continuation-in-part of the U.S. patent application Ser. No. 14/890,088 filed on Nov. 9, 2015 and now issued as U.S. Pat. No. 9,899,929, which is a US national phase application from the International Patent Application No. PCT/US2014/037736 filed on May 12, 2014, which in turn claims priority from the U.S. Provisional Patent Application No. 61/821,902 filed on May 10, 2013.

This patent application is also a continuation-in-part from the U.S. patent application Ser. No. 14/796,204, filed on Jul. 10, 2015, and now published as US 2016/0020701, which claims priority from U.S. Provisional Patent Application No. 62/023,025 filed on Jul. 10, 2014.

This patent application is also a continuation-in-part from the U.S. patent application Ser. No. 15/825,647 filed on Nov. 29, 2017.

This application also claims priority from the U.S. Provisional Patent Application No. 62/587,816 filed on Nov. 17, 2017.

Each of the above-identified patent applications is incorporated herein by reference.

TECHNICAL FIELD

The invention relates to power converters configured according to a true soft switching phase-shifted full-bridge topology and, in particular, to such transformers in which the true soft switching occurs regardless of the value of the leakage inductance in a converter.

Over the years, the term "soft switching technologies" has been used do refer to technologies in which the primary switching elements (interchangeably referred to as primary switcher) in a converter are turned on at zero voltage. These technologies, however, are not configured to create soft switching across the secondary switching elements (interchangeably referred to as secondary switchers). Soft switching for the secondary switching elements of a power converter implies that the secondary switching elements turn off at zero current and there is substantially or completely no ringing and/or spikes of voltage across the secondary switching elements at time of turn off. Elimination of the ringing and spikes across the switching elements in the secondary implies that the turn off is carried out when the current through the secondary switching elements reaches zero or a small negative level and that the charge of the parasitic capacitance across the secondary switching elements is effectuates with a current source.

One of the most popular soft switching topologies is the phase-shifted full-bridge topology. Thus far, in order to obtain soft switching conditions across the primary switching elements, considered the leakage inductance of the converter to be a very important parameter, and such leakage inductance in the transformers was intentionally increased. In traditional soft switching phase-shifted full-bridge topologies, zero voltage switching was obtained by using the energy in the leakage inductance to discharge the parasitic capacitance reflected across the primary switchers (~reflected through the transformer in the primary side). Sometimes, additional inductive elements were used as elements placed in series with the primary winding of the transformer to create a virtual leakage inductance. In some cases, the magnetizing current amplitude was increased in the transformer or in an inductor to form a virtual magnetizing current, in order to have enough energy in magnetizing current to discharge the parasitic capacitances across the primary switchers.

Phase-shifted full-bridge topologies known to date do not ensure soft switching across the secondary rectifiers while the converter is operating in continuous mode. (As a result, large voltage spikes and ringing typically occur across the secondary rectifiers, which negatively affect the efficiency of the overall circuitry and the suppression of which requires the use of an additional electrical apparatus configured to be effective in protecting the transformers from electrical transients (known as a snubber).

SUMMARY

There are many innovative solutions developed over the years to ensure zero voltage switching in the phase-shifted full-bridge topology. In the U.S. Pat. No. 6,862,195, for example, zero voltage switching (ZVS) is accomplished by forcing the current flowing through the secondary switching elements to reach zero before the polarity of the voltage in the secondary changes. However, a person of ordinary skill in the art will readily understand, the disclosed circuitry cannot operate in a continuous mode (which is substantially required in case of usage of high currents, for example, in excess of about 50 A, and/or low voltages, under 12 V, for example), thereby reducing the applicability of such circuitry for low-current and high-voltage applications.

In U.S. Pat. No. 5,231,562, the implementation of the ZVS is accomplished by creating a virtual leakage inductance through the use of a nonlinear inductive element placed in series with the secondary winding. In U.S. Pat. No. 7,009,850, ZVS is accomplished through a voltage injection in the transformer, which induced voltage is superimposed on the voltage induced by the primary switchers, thereby forcing the current through the secondary switching elements to turn off before the voltage changes the polarity in the secondary side of the converter. While these contraptions can be utilized in a continuous conduction mode through the output inductor, they require a presence of an additional transformer, which increases the cost and size of the overall converter. U.S. Pat. No. 5,198,969 discloses a phase-shifted full-bridge circuitry, in which the primary winding is supplemented with additional inductive elements in series, in order to create a larger virtual leakage inductance.

A large leakage inductance in the transformer decreases the effective duty cycle and increases circulating current, which in turn negatively impacts the efficiency of the device. The presence of a large leakage inductance is, therefore, a trade-off with having a very high efficient transformer.

The embodiments discussed below are structured to realize true soft switching in a phase-shifted full-bridge converter circuitry in any operating conditions (including a continuous mode of operation) with the use of very high efficiency transformers with very low leakage inductance. In contradistinction with the implementations of this invention, in phase-shifted full-bridge (PSFB) converter circuits of related art, zero voltage switching cannot be accomplished in each and every operating condition (that is, in all operating conditions) because the energy stored in the leakage inductance of such circuits is not sufficient to discharge the parasitic capacitances of the switching elements in the resonant leg of the circuitry.

When the output current decreases, the energy in the leakage inductance also decreases below the energy level that is required to obtain zero voltage switching. For that reason, in the presented embodiments the leakage inductance may be relatively high (in terms of percentage of the magnetizing inductance, for example in excess of 1%) to ensure that the leakage inductance contains sufficient energy to discharge the parasitic capacitance of the switching element in the resonant leg.

Figure 1:
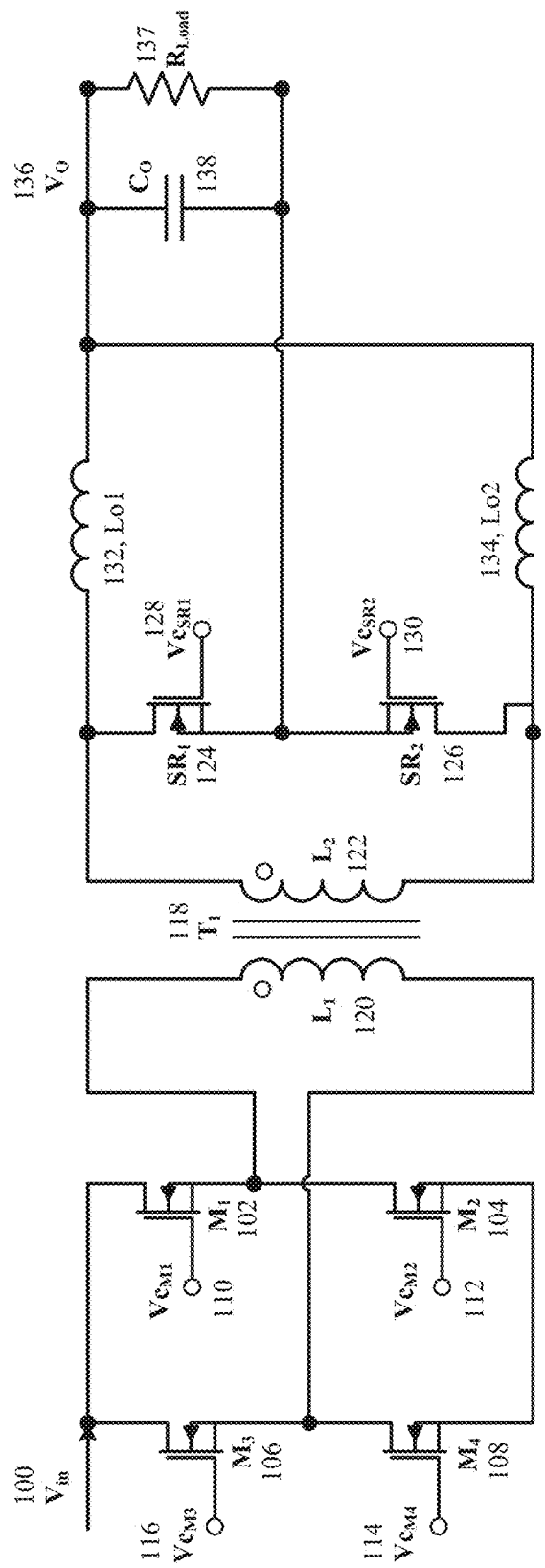
FIG. 1 schematically illustrates a circuit configured according to phase-shifted full-bridge topology with current doubler.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In the embodiments of this invention, through different means the current through the synchronous rectifiers is caused to reach zero before a switching element in a resonant leg of the circuitry turns on. At the moment when one of the synchronous reciters turn off and the magnetizing current can provide the current to the output inductor, and the additional current above the current demanded by the output inductor will flow into the primary discharging the parasitic capacitances of the primary switching elements to zero. Unlike the traditional method of obtaining soft switching using the energy in the leakage inductance in this technology zero voltage switching is guaranteed at and for any loading condition. To achieve the present goal, a process of discharge of the parasitic capacitances across the switching elements from a part of the resonant leg (by the magnetizing current and current from current injection source(s) introduced to the circuitry) starts to after the entire, total energy in the leakage inductance is used, and the voltage across the primary switching elements reach the specific lower level (the leakage current energy discharges the primary switching elements of such lower level, after which the magnetizing current and the current injection take off). The proposed methodology is operable with and applicable to any strength (value) of leakage inductance (including a situation in which the leakage inductance is absent) once the summation of the magnetizing current and the injection current is at a certain predetermined level, thereby eliminating an existing demand to have a minimum specified leakage inductance in the transformer.

A power converter is said to operate in a "continuous mode" when the current through the output inductor of the converter does not reach a zero level during the steady state operation of the converter.

The term "true soft switching topology" and similar terms are defined with respect to and is applied to describe a converter circuitry in which all primary switching elements turn on at zero voltage and in which all of the secondary power switching elements turn off at zero current. In operation of a transformer configured according to a true soft switching topology, the ringing and spiking of voltage across the secondary switching elements are substantially—if not completely—absent and/or lacking (as is depicted, for example, in FIG. 12B, discussed below).

This disclosure discusses several methodologies of converting or modifying a conventional phase-shifted full-bridge topology into a true soft switching topology. One advantage of the embodiments of this invention manifests in that the true soft switching feature applies regardless of the presence of the leakage inductance in the transformer. Notably, the idea of the present invention can be implemented with substantially any configuration of the PSFB circuitry (such as, and including a center tap circuitry, a full-fridge rectification circuitry, and a current doubler circuitry, for example). However, the discussion below is centered around and utilizes primary the current doubler circuitry, for simplicity of illustration of the key embodiments of the idea of the invention.

FIG. 1 illustrates a PSFB topology with current doubler, in which the transformer is replaced with an equivalent transformer circuit including magnetizing inductance and leakage inductance. Here, the primary side of the converter includes the primary switches (M1, 102), (M2,104); (M3, 106); and (M4, 108), as well as the inductor (L1, 120). The secondary side of the converter includes the inductor (L2, 122), the synchronous rectifiers (SR1, 124) and (SR2, 126), as well as output inductors (Lo1, 132), (Lo2, 134) and the output capacitor (Co, 138). The load is indicated with the load resistor (Rload, 137).

Figure 2:
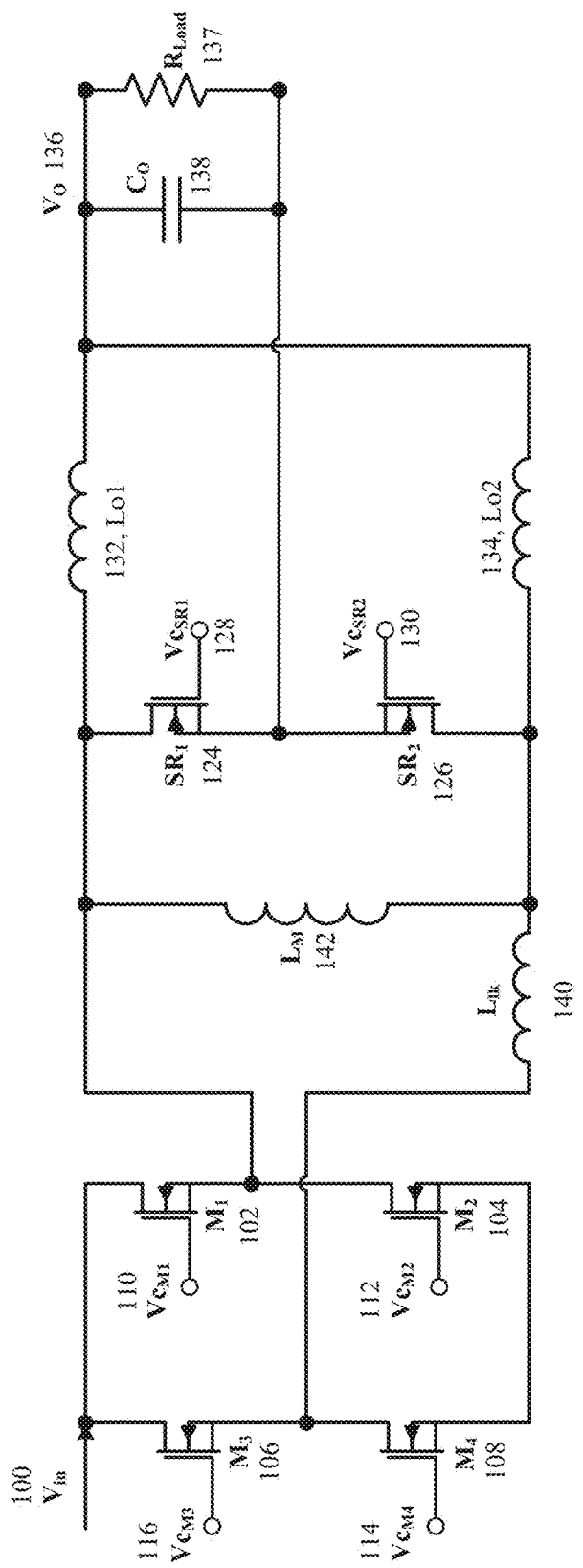
FIG. 2 schematically illustrates circuitry of FIG. 1 with an equivalent circuit for the transformer.

The simplified equivalent circuit, presented in FIG. 2 and including a leakage inductor (Llk, 140) and magnetizing inductor (Lm, 142), illustrates the mode of operation of this topology and the embodiments of current invention.

Figure 3A:
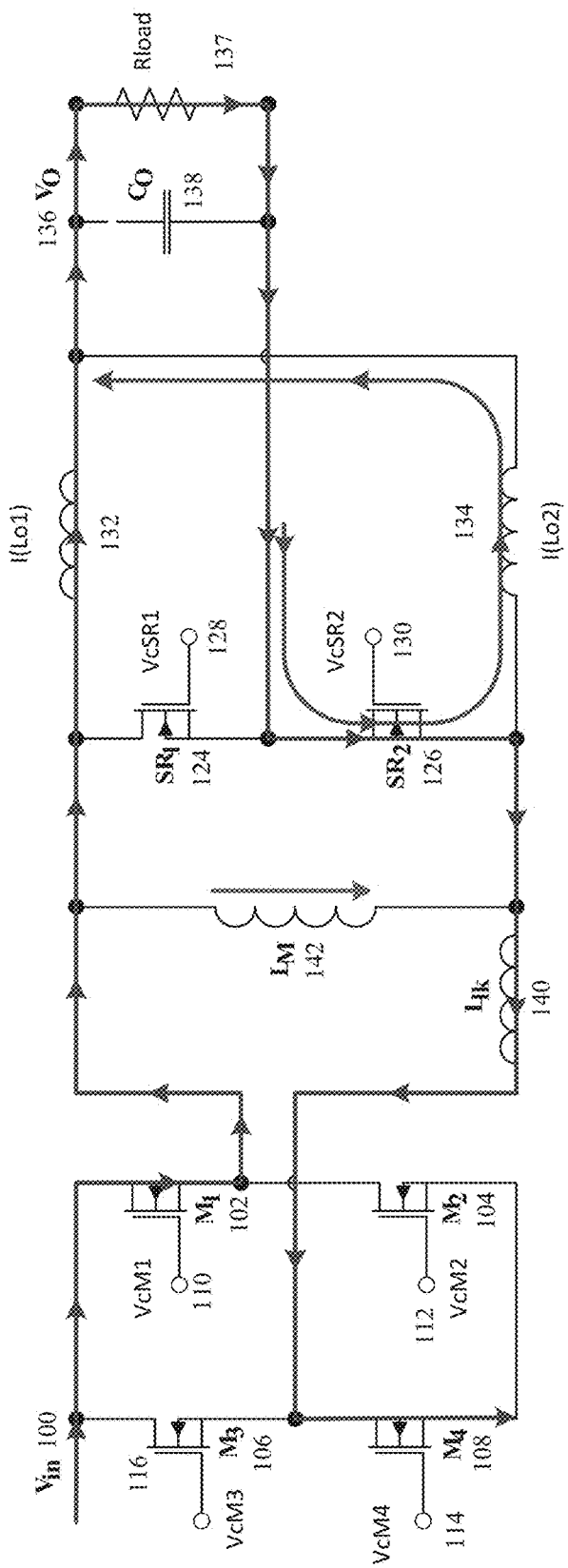
FIG. 3A illustrates the current flow through the circuit of FIG. 2 during the time interval between t0 and t1.

FIG. 3A illustrates the simplified topology of FIG. 2 during the period of time when energy is transferred forward. The corresponding key waveforms are plotted in FIG. 3B, and include:

magnetizing current, (IM, 144), passing through the magnetizing inductor (Lm, 142) of the equivalent circuit;
current I(Lo1) 146 through the output inductor (Lo1,134);
current I(Lo2) 148 through the output inductor (Lo2,132);
current 150 representing a summation of (an aggregate of) the currents 146 and 148;
current 152 passing through the synchronous rectifier (SR2, 126);
current 154 passing through the (M1,102);
current 158 through the output inductor Lo1, reflected in the primary;
control signals for M1 and M2 and control signals for M4 and M3.

Time Interval t0-t1.

Figure 3B:
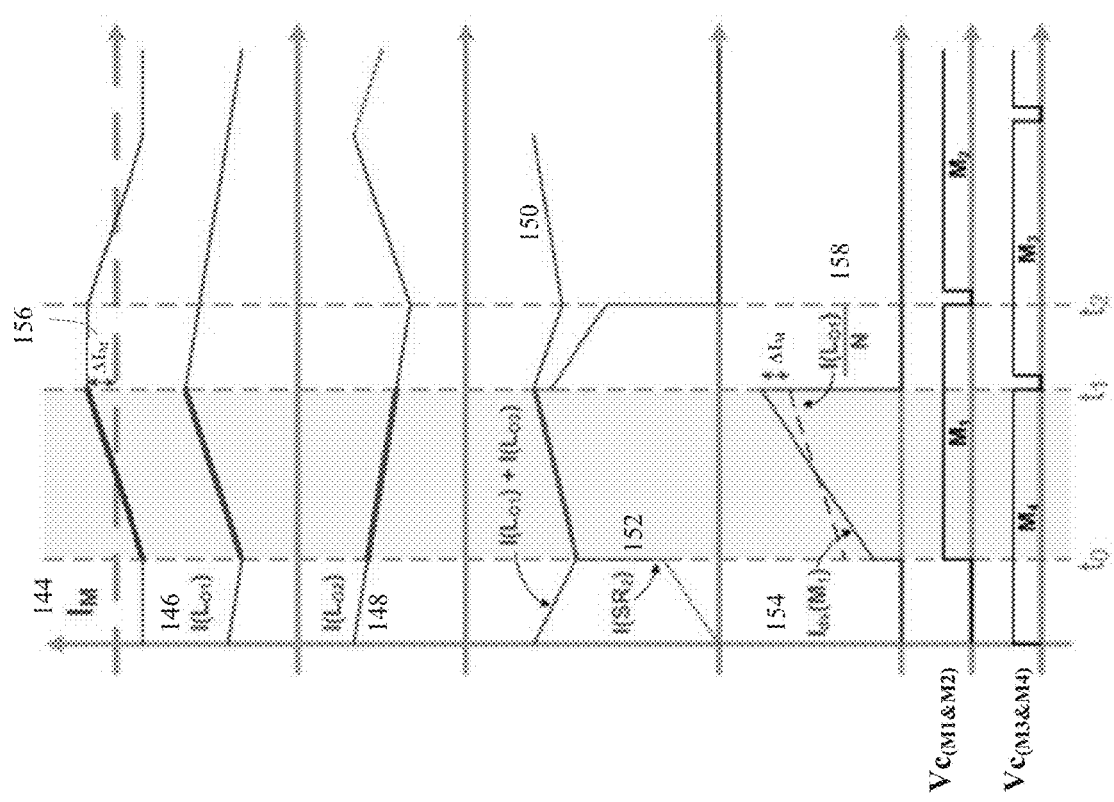
FIG. 3B shows the key waveforms of the circuit of FIG. 3A, highlighting the time interval between t0 and t1.

The operation of the circuit of FIG. 2, configured according to the embodiment of the invention, during the time interval from t0 to t1 is depicted in FIG. 3A and FIG. 3B. During this period of time the primary switches M1, M4 are caused to conduct to enable the forward energy transfer from the input source 100 (voltage Vin) through the output inductor Lo1 and the synchronous rectifier SR2 towards the output voltage (Vo, 136) and further to the load, 137.

During this time period, the magnetizing current (IM, 144), passing through the magnetizing inductor (Lm,142) is increasing in amplitude because the magnetizing inductance (Lm, 142) is placed across the input voltage source (Vin, 100). The current 146 through (Lo1, 132), is increasing due to the transfer of energy from (Vin, 100), stored in (Lo1, 132) and some of this energy is transferred to the output (Vo, 136) that is connected to the load 137. The current 148 through (Lo2, 134) is decreasing, because during this time interval the energy previously stored in Lo2 is transferred to the load, 137.

The aggregate of the currents 146 and 148 is depicted as 150, while the flow of current through the synchronous rectifier SR2 is shown as 152.

The current 154 through the switch (M1, 102) is the summation of i) the current reflected from Lo1 in the primary side and ii) the magnetizing current. The control signals Vc(M1&M2) for M1 and M2 are chosen to be complementary to each other (that is, when one of the signals is high another is low, and vice versa—that is, the signals are not high at the same time) with a very small dead time in between these control signals. The same applies for the control signals Vc(M3&M4) for M4 and M3. As can be seen from comparison of the signals Vc(M1&M2) and Vc(M3&M4), a phase shift is introduced between the two legs of the primary side (the M1 and M2 forming one leg and M3 and M4 forming another leg). The phase shift between these two legs is judiciously controlled in order to regulate the voltage at the output while the input voltage and the loading conditions change.

Time Interval t1-t2.

This time interval is referred to hereinafter as "dead time interval", because the energy stored in Lo1 and Lo2 during the time interval (t0-t1) is transferred to Vo and the load, 137.

Figure 4A:
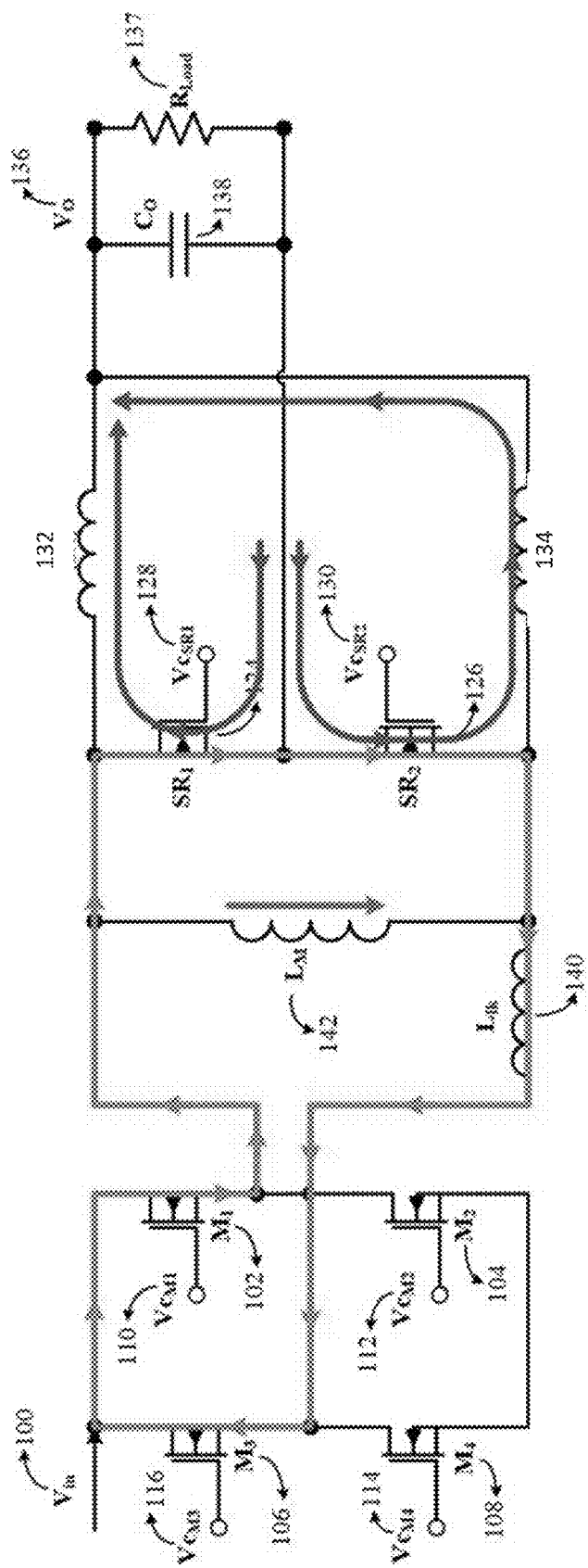
FIG. 4A shows the current flow through the circuit of FIG. 2 during the time interval between t1 and t2.
Figure 4B:
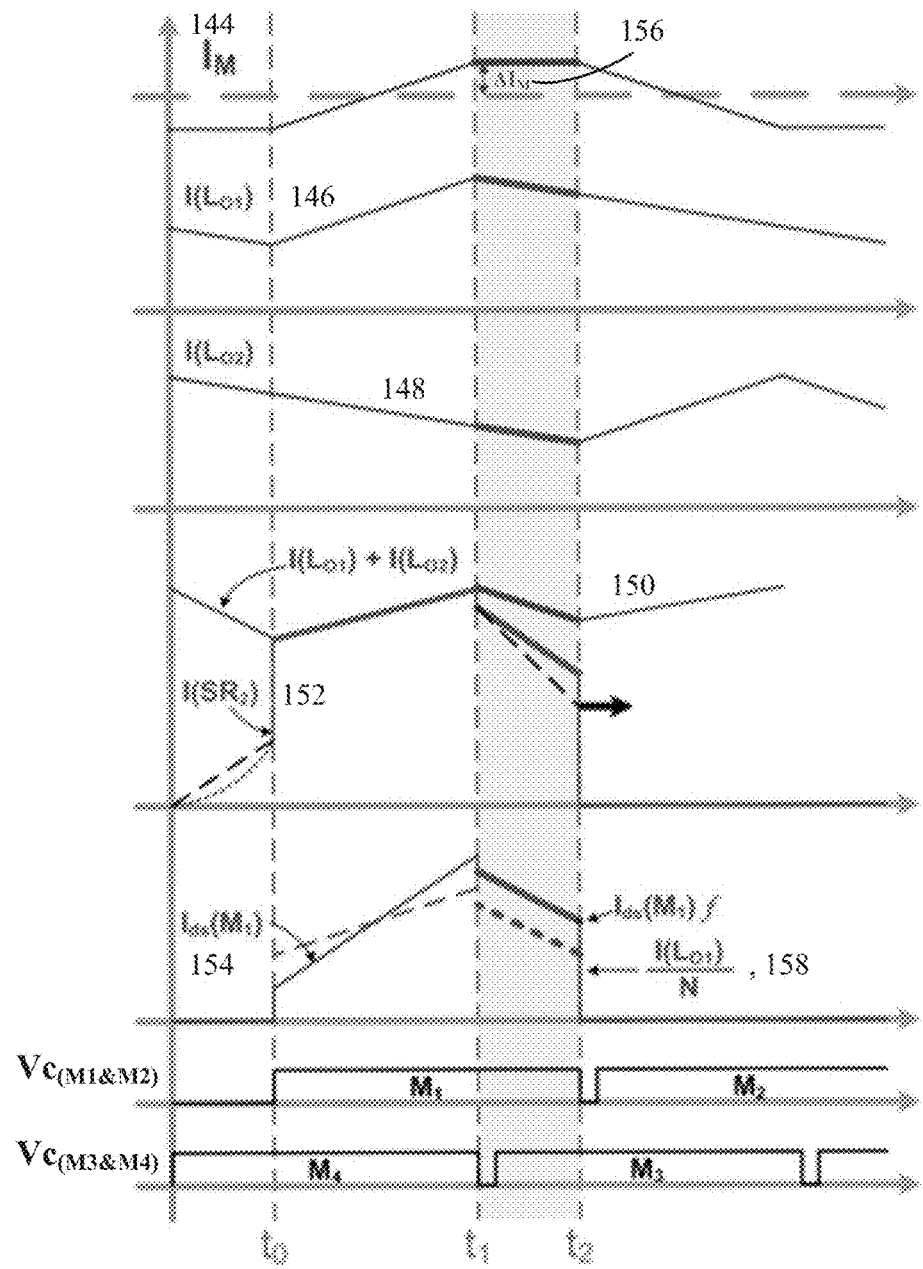
FIG. 4B show the key waveforms of the circuit of FIG. 4A, highlighting the time interval between t1 and t2.

The operation of an embodiment during this time interval, which immediately follows the interval (t0-t1), is depicted in FIG. 4A and FIG. 4B. During this period of time (M1, 102) and (M3, 106) are caused to conduct and the primary side of the transformer is shorted, as depicted in FIG. 4A. At the same time, both synchronous rectifiers SR1, SR2 are conducting. Accordingly, the magnetizing current 142 flowing through (Lm, 142) has two low impedance paths to flow. A portion of the magnetizing current 144 may flow into the primary side through M1 and M3, and another portion may flow into the secondary side via SR1 and SR2. The split of the magnetizing current is accomplished as a function of varying impedance values of these two possible paths. In the event the impedance values of these two paths are substantially zero, the magnetizing current maintains its value or amplitude, as depicted in FIG. 4B. In practice, however, because zero impedance is not practical, the magnetizing current slightly decays in amplitude between the moments of time t1 and t2.

The currents 146, 148 through Lo1 and Lo2, respectively, decay during this time interval. As will be readily appreciated by a skilled artisan, the current flowing through M1 and also through the leakage inductor 140, is caused to decay during this time interval for several reasons: a) due to decay of the currents 146, 148 through Lo1 and Lo2 (due to the energy transfers to the load, 137), and b) due to slight decay of the magnetizing current 144 discussed above (as related to the impedance of the primary switchers, M1 and M3, and the impedance of the synchronous rectifiers SR1 and SR2). The current flowing in the primary side at the end of (t1-t2) time interval, is denoted as (Ids(M1)f, 190). This current is flowing also through the leakage inductor, 140 before the M1 switch turns off at the moment t2. $\Delta I_M$, denoted as 156, is half the value of variation of the magnetizing current during the period (t1-t2). The parameter 158 represents the value of the current 146 reflected into the primary side and divided by the turns ratio N.

Figure 5A:
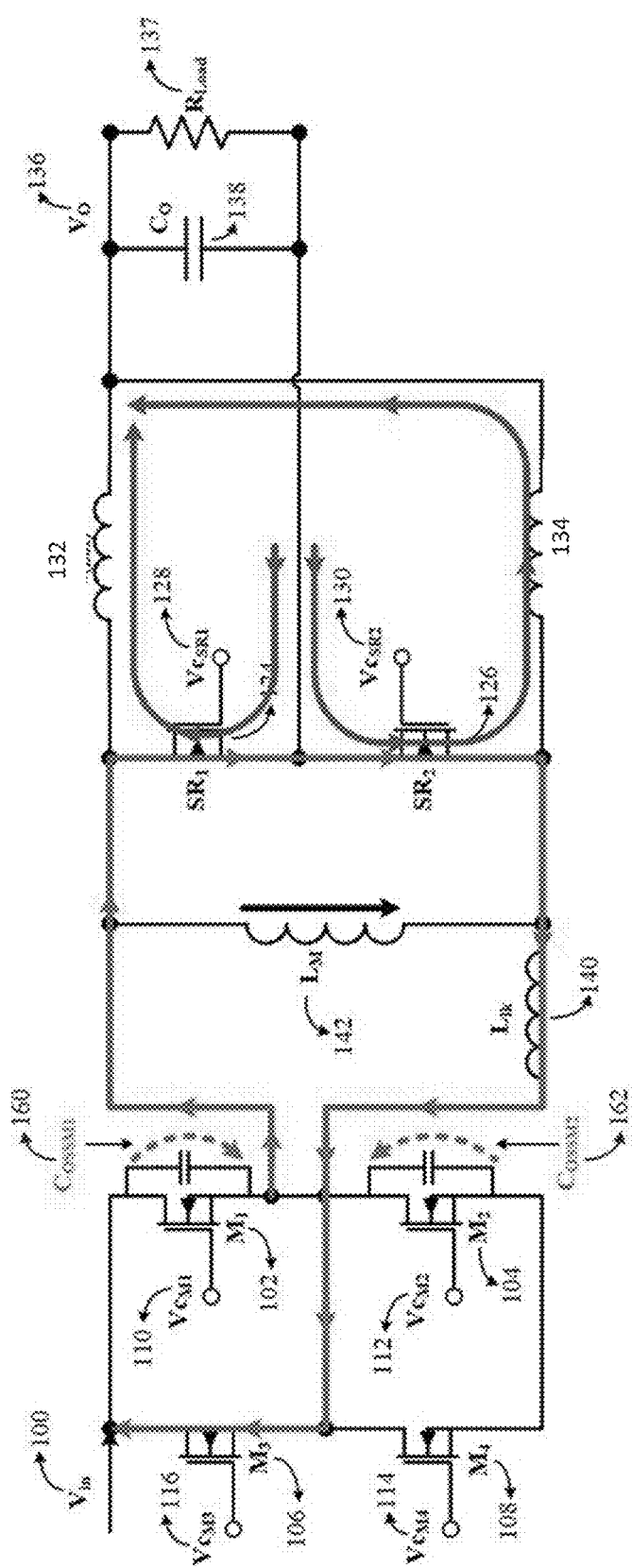
FIG. 5A shows the current flow in the circuit of FIG. 2 when the primary switch M1 turns off.
Figure 5B:
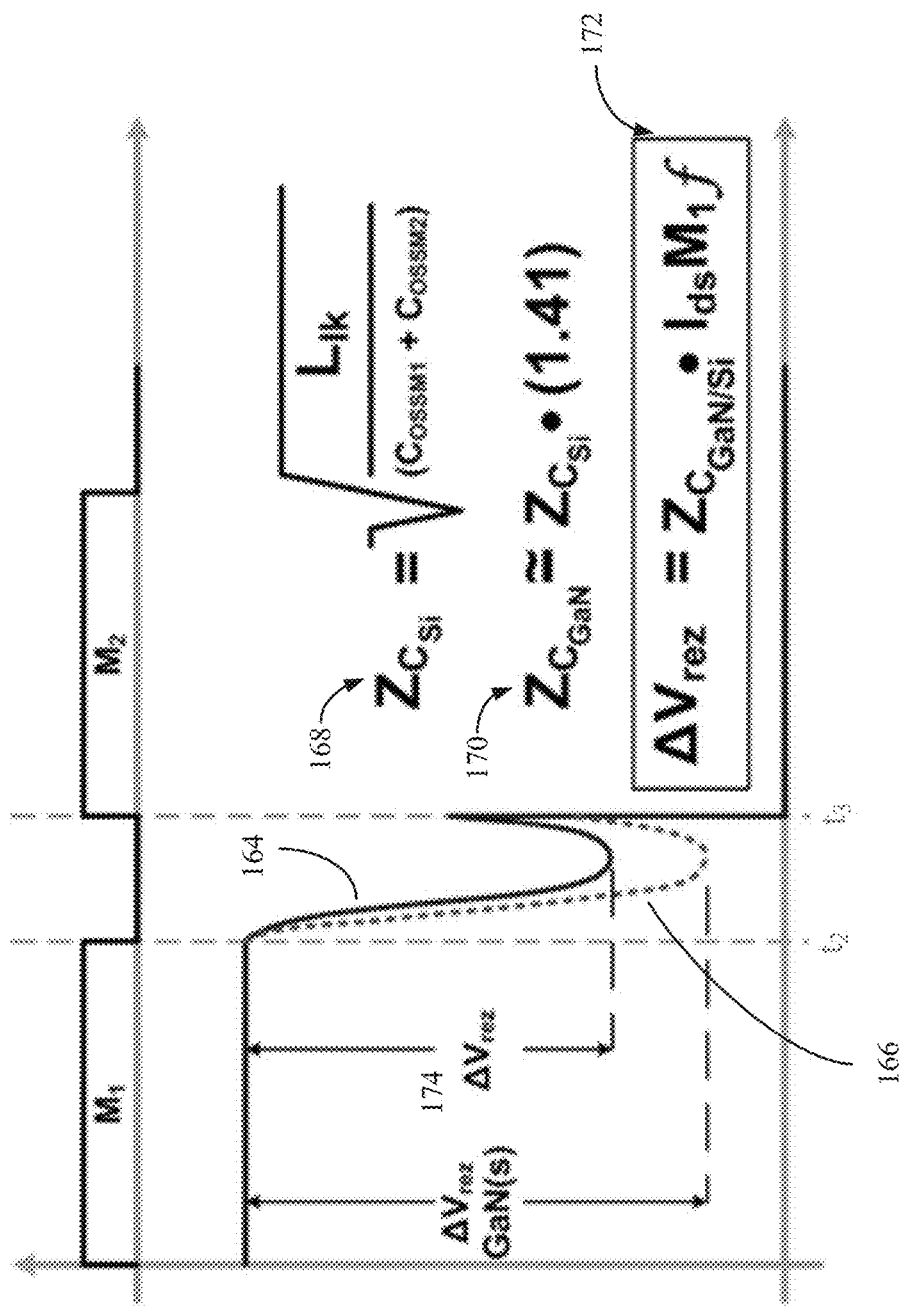
FIG. 5B shows the key waveforms of the circuit of FIG. 5A.

In FIG. 5A the current flow in the PSFB circuit of FIG. 2 is shown when M1 switch turns off, while FIG. 5B illustrates the distribution of voltage across M2 when M1 turns off.

Specifically, at the time t2, when M1 is turned off, the current flowing through the leakage inductor 140 is (Ids(M1)f, 190). The parasitic capacitances across M1 and M2, (denoted as 160,162, respectively) together with the leakage inductor (Llk, 140) form a resonant circuit that has characteristic impedance Zc, 168. The voltage across M2 ($\Delta Vrez$, 174), swings from the input voltage level towards zero in a resonant transition. The voltage swing is proportionate to the characteristic impedance Zc and the current Ids(M1)f through the leakage inductor. For higher value of leakage inductance and higher amount of current through switching devices at turn off the voltage across M2 will reach zero. That is depicted in FIG. 5B. The switch M1 is turned off at t2 and the switch M2 is turned on at t3 (and, preferably, at low voltage across M2). FIG. 5B provides comparison of different situations. Here, 164 denotes the voltage across M2 during the resonant transition towards zero caused by the energy of the leakage inductance; 166 represents the same voltage during analogous resonant transition in the case when the M2 switch has a lower parasitic capacitance (as compared with 164; for example if the switch it is a GaN-based rather than a silicon based mosfet); 170 represents the characteristic impedance when the main switch is GaN-based; and 168 represents the characteristic impedance when the main switch it is a silicon mosfet.

Figure 6A:
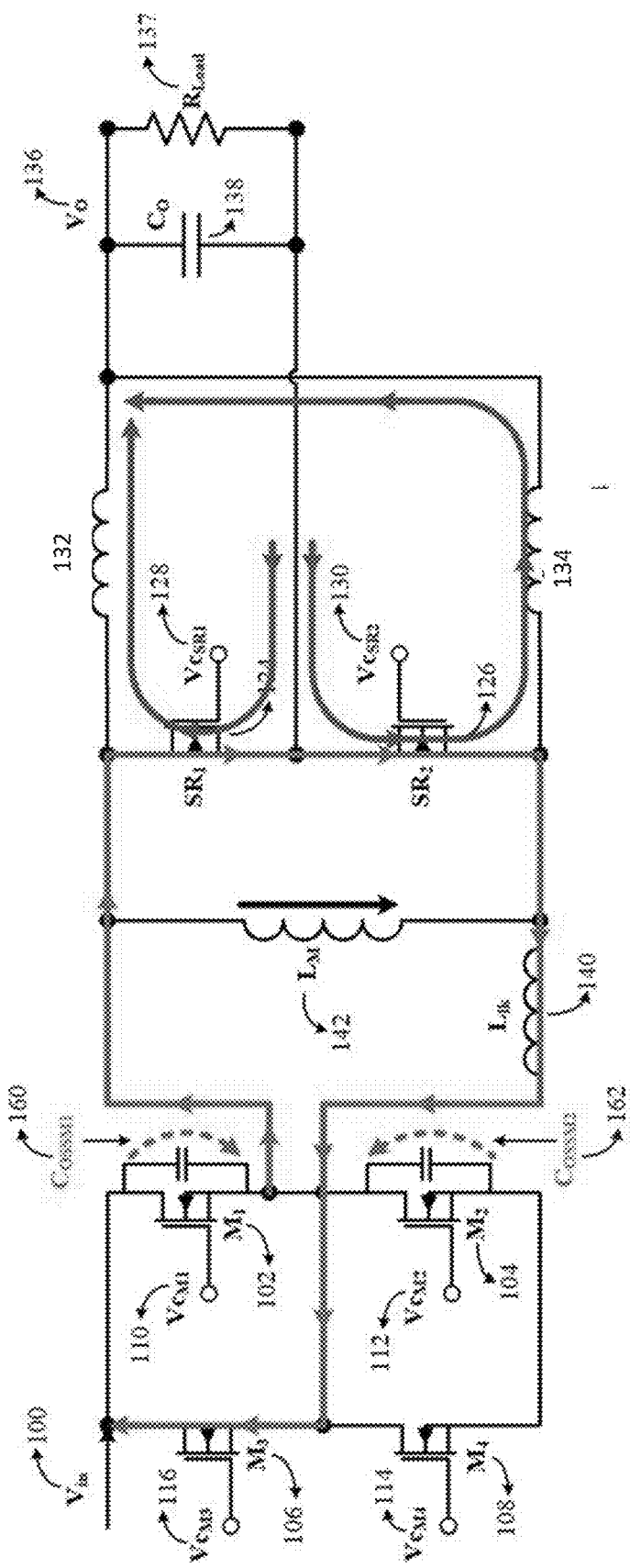
FIG. 6A shows the current flow in the circuit of FIG. 2 when the primary switch M1 turns off.
Figure 6B:
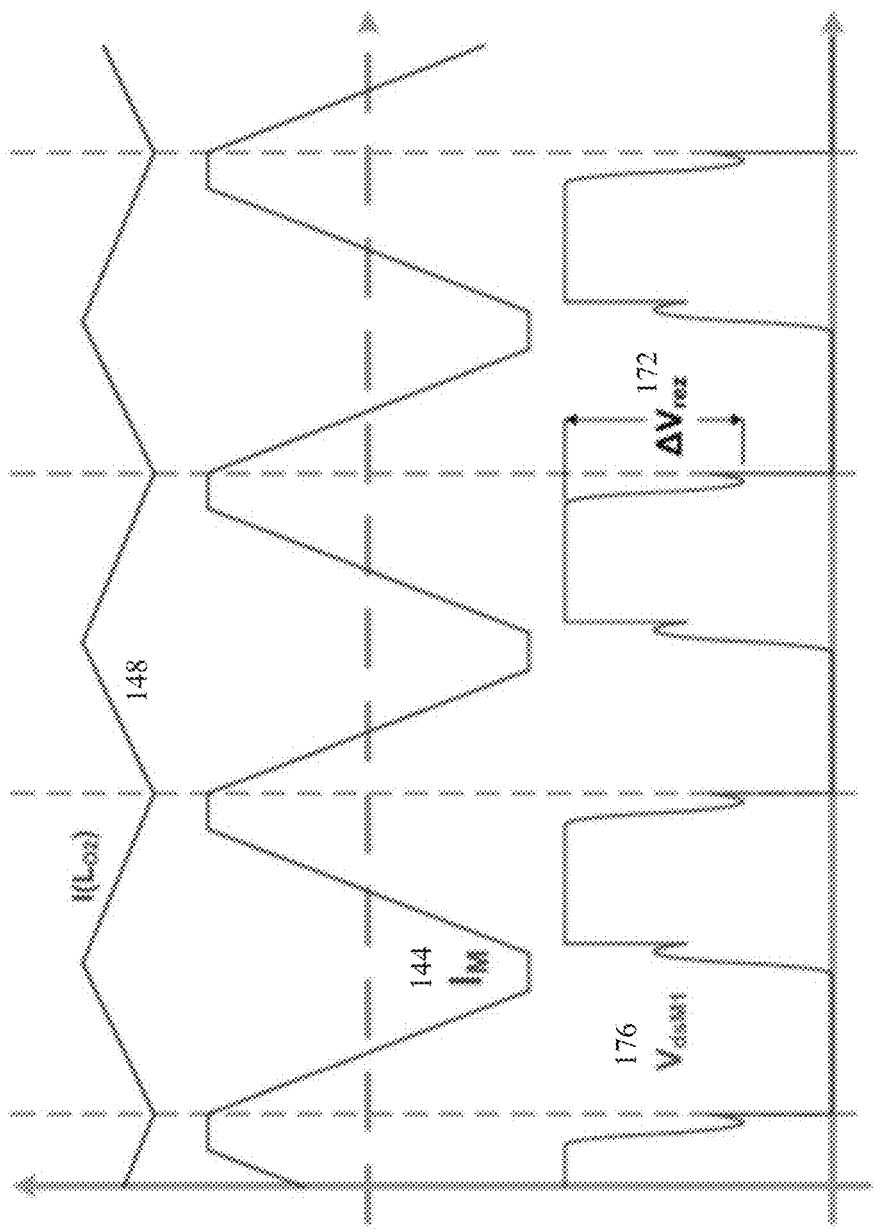
FIG. 6B shows the key waveforms of the circuit of FIG. 6A.

FIG. 6 illustrates several key waveforms, such as current 148 through the output inductor (Lo2, 134), the magnetizing current (IM, 144), and the voltage 176 across M1, as well as the voltage swing ΔVrez, 174. In the event the leakage inductance is very small, the voltage swing ΔVrez, 174 is not large enough to obtain zero voltage switching condition for M2 at turn on. Very efficient transformer structure have inherently, a low leakage inductance (typically, less than 1% of the value of the magnetizing inductance). Accordingly, the embodiments of this invention present several solutions to obtain zero voltage switching in a PSFB topology using a transformer with a low leakage inductance.

In particular, presented are two non-limiting methods of obtaining zero voltage switching conditions across all the switching elements regardless of any of the loading condition, input voltage and regardless of the leakage inductance.

Example 1

Figure 7A:
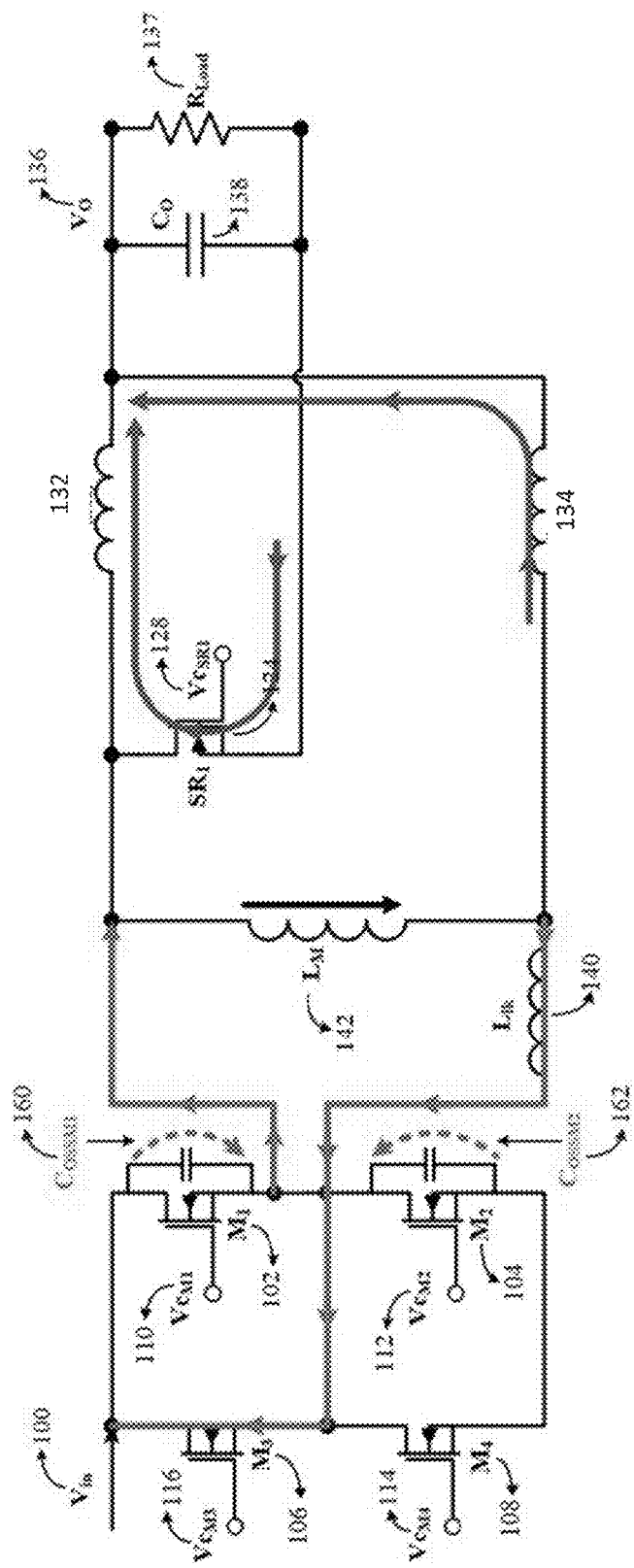
FIG. 7A shows the current flow in the circuit of FIG. 2 when the value of magnetizing current exceeds the lowest amplitude of the current through the output inductor.
Figure 7B:
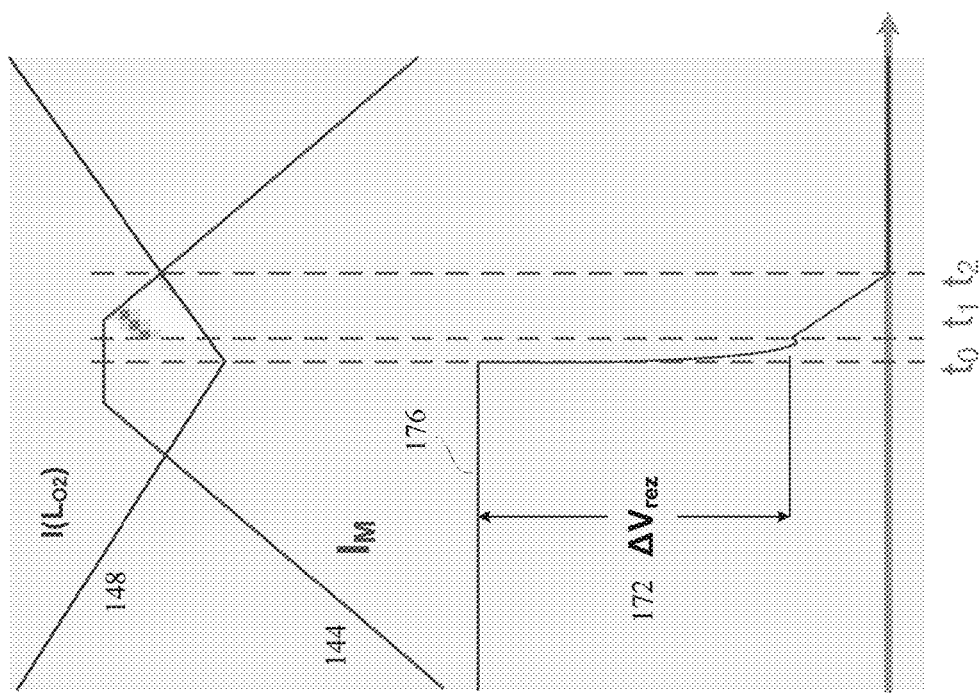
FIG. 7B shows the key waveforms of the circuit of FIG. 7A.

In one embodiment, the operation of a converter includes increasing the magnetizing current to exceed the level defined by the lowest amplitude of the current passing through the output inductor, as depicted in FIG. 7B, which complements FIG. 7A by illustrating the current flow (in the example of a PSFB circuitry of FIG. 2) when the magnetizing current 144 exceeds the current 148 through the conductor Lo2 at its lowest amplitude. While application Ser. No. 14/274,701 addressed a possibility of using a similar concept as applied to a half bridge topology, the present invention this concept is applied to a phase shifted full bridge topology.

Initially, at the moment t0, the switch (M1, 102) is turned off. The energy in the leakage inductor 140 discharges the parasitic capacitance across the switch (M1, 102) in a resonant manner as described in the equation of FIG. 5B, providing an expression for (ΔVrez, 172), is derived. ΔVrez represents the voltage swing across M2, when the M1 turns off and the leakage inductance energy starts discharging (in a resonant manner) the voltage across M2.

The resonant swing of voltage 176 lasts until t1, as depicted in FIG. 7B. Further, in the event when the magnetizing current (IM, 144) exceeds the current flowing through Lo2 (as shown in FIG. 7B), the current passing through (SR2, 126) becomes zero and then the controller will turn off SR2. When (SR2, 126) is turned off, the full bridge circuit of the example of FIG. 2 is substantially equivalent of the full bridge circuit depicted in FIG. 7A. By opening the synchronous rectifier (SR2, 126), the current represented by the difference between the values of the magnetizing current (IM, 144) and the current passing through the output inductor Lo2 flows into the primary side and initiates discharging linearly the voltage across the switch (M2, 104) during the period from t1 to t2 when the voltage across M2 reaches zero. As the person of skill in the art will readily appreciate, these developments occur only if and when the magnetizing current IM is higher the current through Lo2 between t1 to t2, as depicted in FIG. 7B.

In a PSFB topology the switches M1 and M2 form the resonant leg, and M3 and M4 form the linear leg. The switching elements from the linear leg turn on at zero voltage switching conditions regardless of operating condition of the converter. When any of the switching elements within the linear leg is turned on, the voltage induced in the secondary winding is substantially zero. When any of the switching elements of the resonant legs is turned on, the voltage induced in the secondary winding is substantially larger than zero.

Figure 12B:
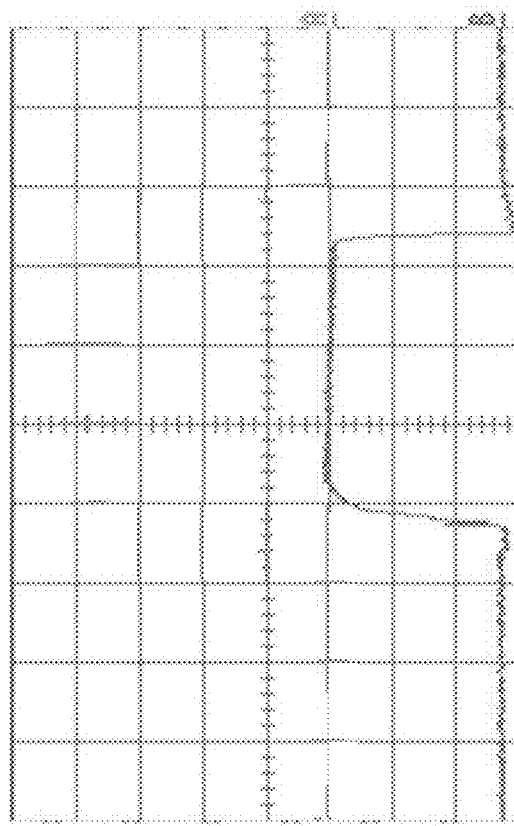
FIGS. 12A, 12B shows the empirically-measured waveform across the synchronized rectifier for operation in hard switching mode (in which the primary switching elements do not turn on under the zero voltage switching condition and the synchronized rectifiers do not turn off at zero current, FIG. 12A) and the experimental waveform across the synchronized rectifier for operation in "true soft switching" mode (FIG. 12B) where the primary switching elements turn on at zero voltage and the synchronized rectifiers turn off at zero current.
Figure 12A:
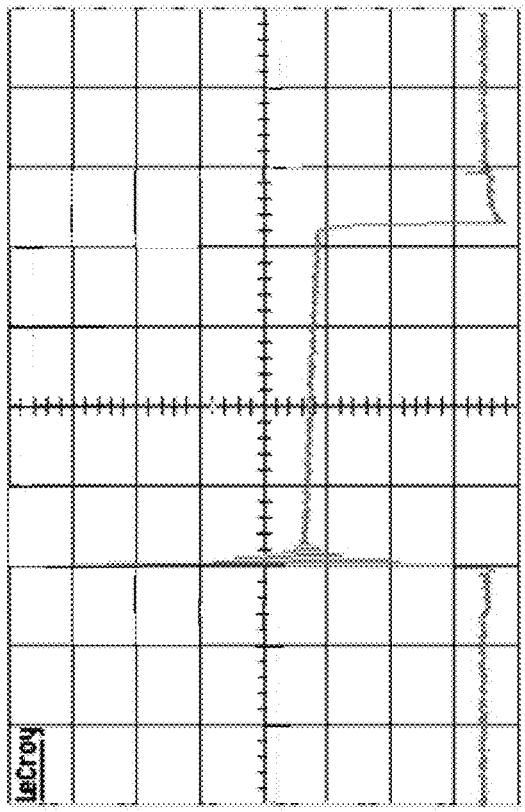

An important advantage of this technology is the fact that the parasitic capacitance across a synchronous rectifier, of the circuitry, that is turned off is charged by a current source (in the above discussed case—the magnetizing current IM). As a result, any ringing and/or spikes across the synchronous rectifier at turn off are eliminated. FIGS. 12A, 12B provide plots illustrating two experimental waveforms showing the voltage across the synchronized rectifiers. FIG. 12A shows the voltage across the synchronized rectifier in hard switch mode of operation, clearly illustrating the ringing and spikes across the synchronized rectifier, The second experimental waveform, of FIG. 12B, depicts the voltage across the synchronized rectifier in the circuitry operating in a "true soft switching" mode, as discussed in this application, As a result of the application of the discussed methodology, one obtains zero voltage switching (ZVS) in all switching elements of the circuitry while eliminating the spikes and ringing across the synchronous rectifiers of the circuitry. In a PSFB circuit in which the magnetizing current exceeds the current through the output inductor during the entire time of voltage transition across the switching elements in the resonant leg, the ZVS is, understandably, achieved regardless of the loading conditions, input voltage and/or the leakage inductance in the transformer.

The above-described method of obtaining zero voltage switching under any loading conditions, any input voltage, and regardless of the value of the leakage inductance may incur one penalty, however. In particular, an increase in magnetizing current leads to higher conduction loss which may impact the efficiency in the event when such conduction loss exceeds the efficiency gain by the elimination of the switching losses. This situation is addressed below.

Example 2

Figure 8B:
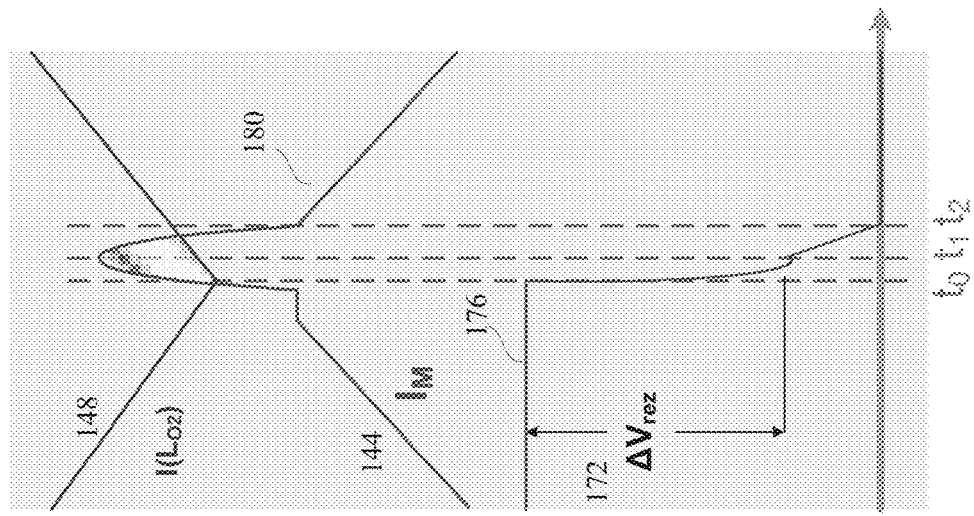
FIG. 8B shows the key waveforms of the circuit of FIG. 8A.
Figure 8A:
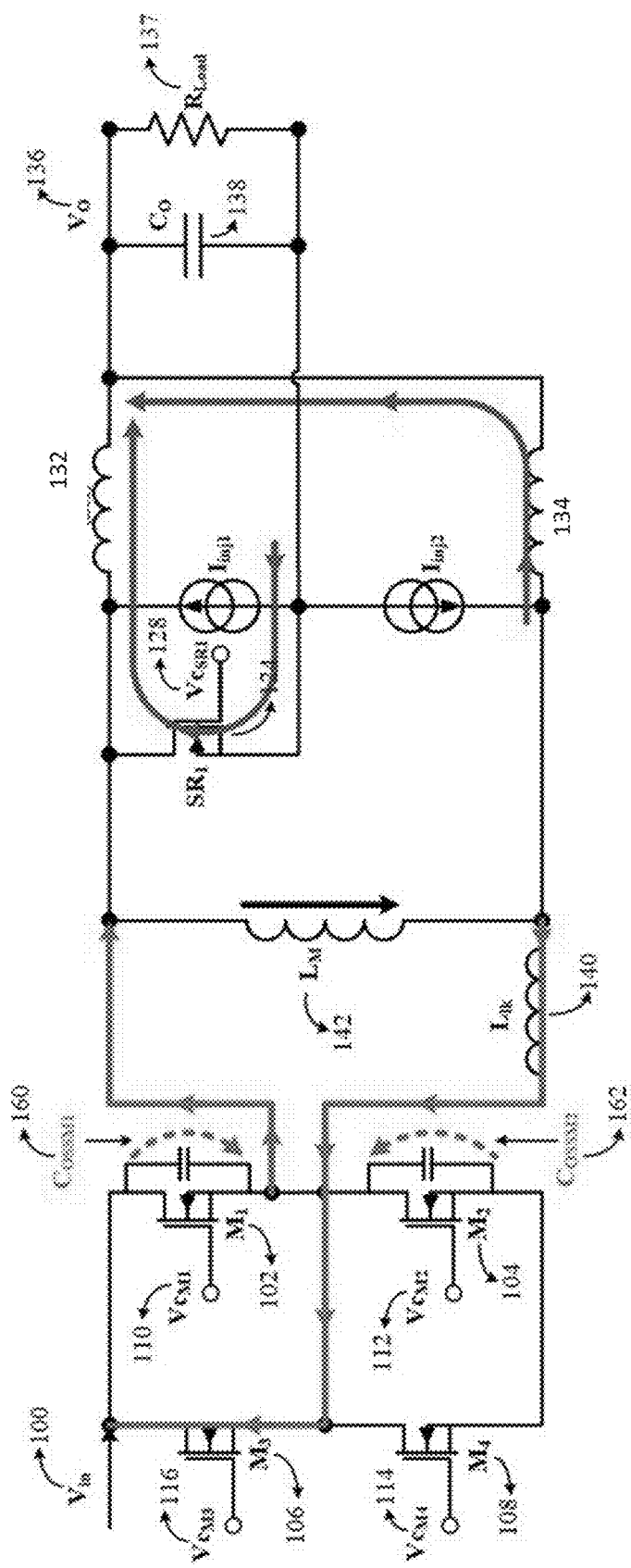
FIG. 8A shows the current flow in the circuit of FIG. 2 when the sum of the magnetizing current and the injection current exceeds the lowest amplitude of the current through the output inductor.

FIGS. 8A, 8B illustrate a related embodiment of this invention employing current injection. Here, two current injection circuits (denoted Iinj1, Iinj2) are present across the synchronous rectifiers SR1, SR2. A similar concept was presented in the patent application Ser. No. 15/068,598 in application to a half bridge converter. In this implementation, the sum of current from the current injection circuit ($I_{inj}2$ in FIG. 8A) and the magnetizing current has to exceed the output current through the output inductor at its lowest amplitude, and that condition is maintained over the entire time during the voltage transition across the switching elements of the resonant leg. According to the idea of the invention, the current injection circuit, Iinj2 (and, accordingly, Iinj1 during the next cycle), is activated prior to the time when the resonant transition ends at the time t1, in order to take over the discharge of the parasitic capacitance across the switching rectifiers in the resonant leg and to create zero voltage switching conditions across the switching elements in the resonant leg.

As a skilled artisan will appreciate from the above discussion, the operation of the PSFB circuit complemented with two current injection circuits across the synchronous rectifiers allows the user to achieve zero voltage switching condition regardless of the loading conditions, input voltage, and/or the leakage inductance in the transformer when the sum of the magnetizing current and the current injected into the PSFB circuitry from the current injections circuits is larger than the current through the output inductor during the entire time of voltage transition across the switching elements in the resonant leg Example 3

Figure 9:
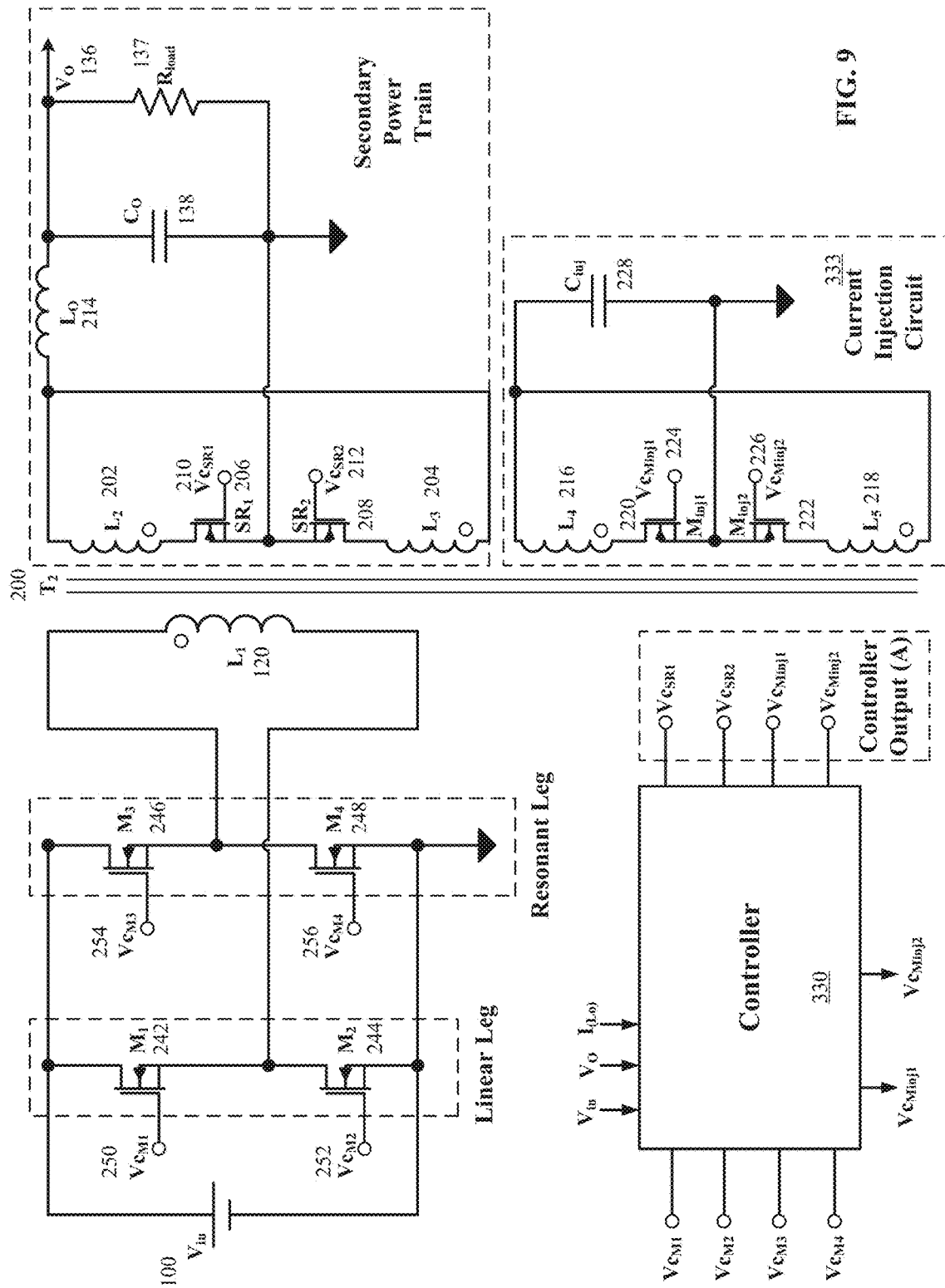
FIG. 9 is a schematic diagram representing a phase-shifted full-bridge converter with a current injection circuit.

Referring now to FIG. 9, a PSFB topology with center tap in the secondary side is illustrated, which employs the current injection. The transformer 200 of FIG. 9 has the primary winding (L1, 120) and two secondary windings (L2, 202) and (L3, 204). In addition to that there are two windings (L4, 216) and (L5, 218) are operationally associated with the current injection circuit, also containing two switching devices, (Minj1, 220) and (Minj2, 222). The windings L4 and L5 are the current injection windings and part of the current injection circuit.

Here, the PSFB circuit is formed by two half-bridges, each half-bridge containing two totem-pole switching elements. Here, the half bridge configuration as part of PSFB circuit is also referred to as a leg. Accordingly, FIG. 9 illustrates two legs, one is linear leg that includes by the combination of (M1, 242), (M2, 244) and another leg is referred to as a resonant leg, which includes the combination of (M3, 246) and (M4, 248) In this PSFB circuit, the switching elements in the linear leg turn on at zero voltage regardless of the operating condition (the transition is done by the magnetizing current which is not trapped in the secondary side because the voltage in the secondary is zero and no energy is transferred to the secondary side). The switching elements part of the resonant leg, on the other hand, do not turn on at zero voltage switching condition except if certain conditions are met. (The condition is that the energy contained in the leakage inductance has to be sufficient to discharge the parasitic capacitance of the switchers. For example, if the output current decreases the energy in the leakage inductance decreases and it may not be enough to obtain zero voltage switching.)

Figure 10:
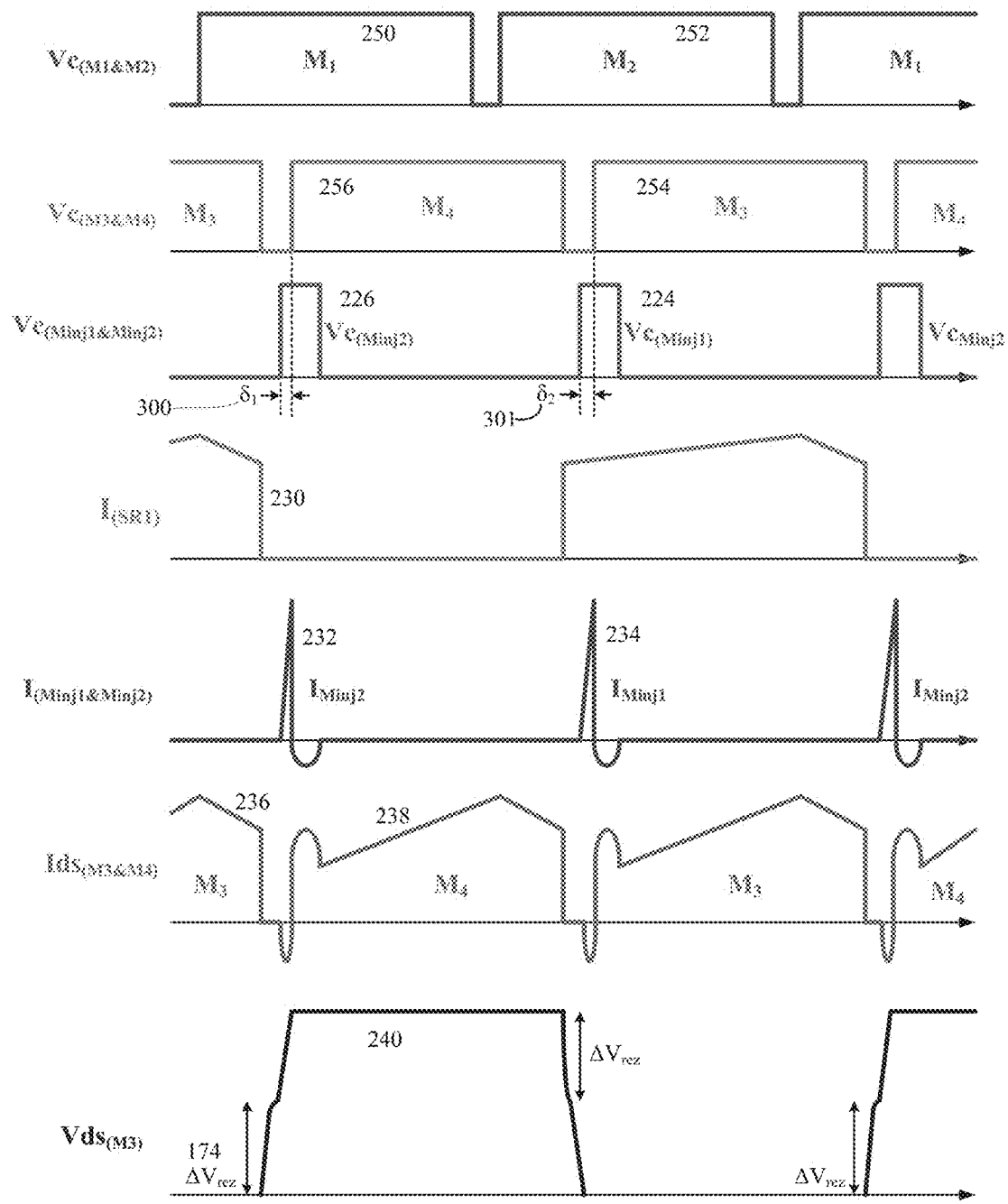
FIG. 10 shows the key waveforms of the circuit of FIG. 9.

FIG. 10 includes plots representing key waveforms associated with the operation of the circuit depicted in FIG. 9. The waveforms depicted in FIG. 10 are: the control signals 250, 252 (for M1 and M2, respectively), the control signals 254, 256 (for M3 and M4, respectively); the control signals Vc(Minj1), 224, and Vc(Minj2), 226 (for the current injection switching elements Minj1 and Minj2, respectively); the current 230 through the synchronous rectifier SR1; the current injections 232, 234 (through Minj2 and Minj1, respectively); the currents 236, 238 (through M3 and M4, respectively); and the voltage 240 across M3.

The control Vc(Minj2), 226 of the current injection through Minj2 is activated ahead of the moment when M4 is turned on and, specifically, at the moment preceding the turn on of M4 by a time interval $\delta 1$, 300. The control Vc(Minj1), 224 for the current injection through Minj1 is activated ahead of the turn on of M1 by a time interval $\delta 2$,301.

$\delta 1$ and $\delta 2$ are controlled by the control electronic circuitry 330 of FIG. 9. The larger $\delta 1$ and $\delta 2$, the larger the peaks current of the current injections, 232, 234 is. One of the embodiments of the current injection circuit, shown as 333 in FIG. 9, allows to control the peak (the maximum value) of the current injection by controlling $\delta 1$ and $\delta 2$. For example, for high output current, the peak of the current injection should be higher in order to obtain zero voltage switching on the primary switchers. In the current injection circuit 333 presented in FIG. 9, the peak of the current injection is self-adjustable. (The current injection will ramp up until the voltage on the current injection winding L4 and L5 reaches the voltage across Cinj. The latter condition is satisfied when the voltage across the M4, and respectively M3, reaches zero. This creates a self-adjusting feature of the current injection 333 presented in FIG. 9).

Figure 13:
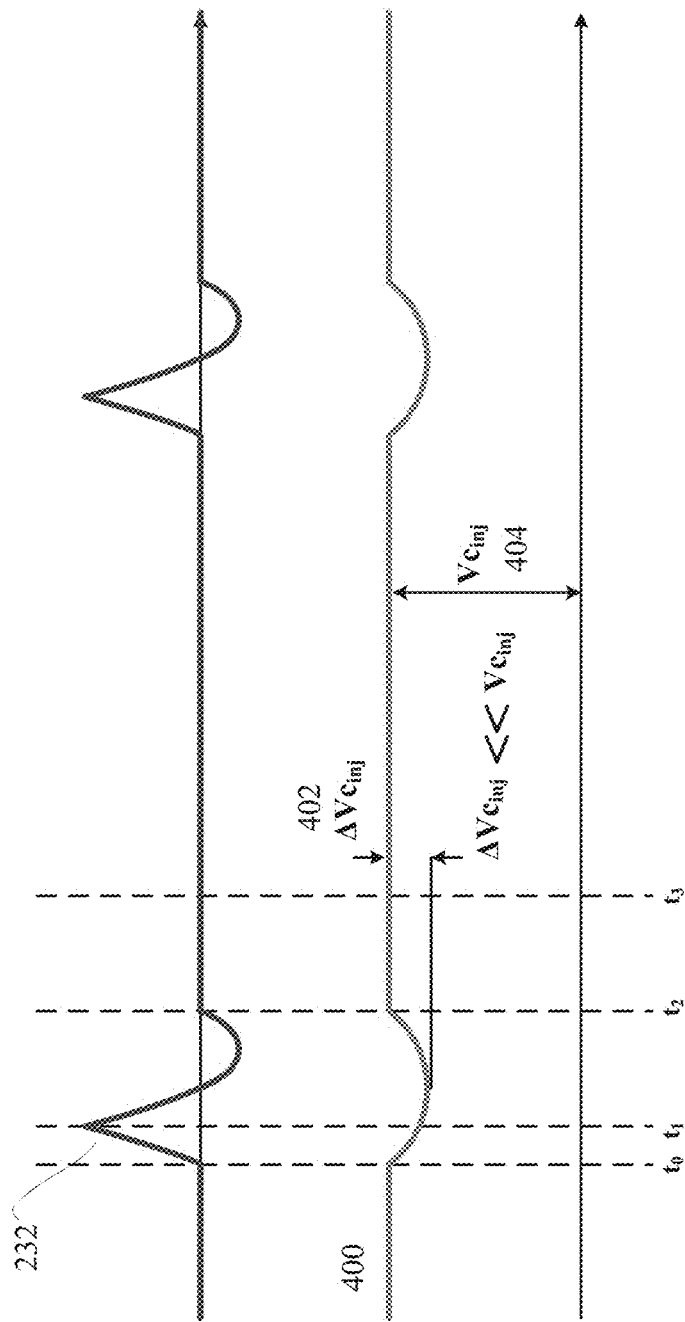
FIG. 13 presents plots showing, as a function of time, the current injection and the voltage across the Cinj in one embodiment, where the voltage across Cinj does not have a large variation during the flow of the injected current.

In further reference to FIG. 9, when the current injection switch is turned on, the current through this current injection switch is ramping up almost linearly (as indicated with the peaks labeled 232 in FIG. 10 and in FIG. 13, between t0 to t1). The linear ramp up ends when the voltage across the switchers in the resonant leg reaches zero, at which time the value of the current stops increasing (at t1 in FIG. 13). The process of recharge of the injection capacitor Cinj 228 ends at t2. The current injection has the role of forcing the current through the synchronous rectifier (the one conducting at the time) to reach zero level and to turn off such synchronous rectifier. After that, the current injection has the role of discharging the parasitic capacitance across the switching elements of the resonant leg to zero. In FIG. 10, as shown by the waveform Vds(M3), a resonant discharge of the parasitic capacitance across the switching elements in the resonant leg ($\Delta$Vrez) initially occurs, followed by a linear discharge due to magnetizing current and the current injection. In order to satisfy the condition, of the present idea, that the injected current (reflected into the secondary winding) together with the magnetizing current (reflected in the secondary winding) has to exceed the current flowing through the synchronous rectifiers, the amplitude of the injected current injection has to be proportional with the output current, which is the summation of the current through Lo1 and Lo2, which is I(Lo1), 146 and I(Lo2),148. The maximum level for the current injection is controlled by controlling the durations of $\delta 1$ and $\delta 2$.

In further reference to FIG. 9, to ensure zero voltage switching conditions, the sum of the magnetizing current and the injected current has to exceed the lowest amplitude of the current passing through the output inductor (Lo, 214). The magnetizing current amplitude—once set by the air gap configured in the transformer—is controllable by changing the frequency of operation, which is the repetition frequency of the control signals that drive the switchers. For higher amplitude of the magnetizing current this frequency has to decrease, and for smaller amplitude of the magnetizing current this frequency has to increase. The control of the maximum level of the current injection is effectuated by controlling the durations of $\delta 1$ and $\delta 2$ in such a way as to increase the maximum level of current injection, $\delta 1$ and $\delta 2$ have to be increased. One feature of the implementation of the idea of the invention manifests in that the peak of the current injection is clamped when the voltage across the primary switchers reaches zero. This occurs when Cinj has a substantial value in such a way that the ripple across Cinj is small as comparison to the average voltage across Cinj (for example, less than 20% of the average voltage across Cinj). The current injection and the voltage across the across the Cinj, 228, are presented in more detail in FIG. 13. The ripple across Cinj, denoted as (ΔVCinj, 402) is much smaller than the average voltage across Cinj, denoted as (VCinj, 404). In contradistinction with the presented embodiment, other current injection circuits (such as the one presented by Mao in U.S. Pat. No. 7,548,435 B2, for example) do not have this capability because the Mao current injection circuit is resonant wherein the Cinj is part of the resonant circuit and, as a result, the voltage across Cinj varies within very large range, even reaching the zero value.

As mentioned before, one advantage of the current injection circuit of FIG. 9 presented in this disclosure is that the ramp up of the current injection, shown as 232 is automatically limited when the voltage across the switching elements in the resonant leg reaches zero, which greatly simplifies greatly the control of the circuit in operation.

The voltage 240 across M3 is shown in FIG. 10. In FIGS. 9, M3 and M4 form the resonant leg and M1 and M2 form the linear leg (unlike in the full bridge configuration presented in the previous drawings: for example in FIG. 8A, M1 and M2 form the resonant leg, and M3 and M4 form the linear leg). As shown, when the switching element M4 turns off the voltage across M3 swings towards zero in the resonant manner, decaying by a voltage swing ΔVrez, 174, where the decay is proportionate to energy stored in the leakage inductance. Further the voltage across M3 decays linearly to zero, with the slope proportionate to the difference between the sum of the magnetizing current and injected current, reduced by the amount of the current through (Lo, 214): $(I_M+Iinj1)-I(Lo)$ and, respectively, $(I_M+Iinj2)-I(Lo)$.

The controller 330 is configured to produce the signals for the primary switcher in the primary side and for the synchronous rectifiers in the secondary side and also for the current injection. The current injection circuit 333 can be located in the primary side or the secondary side.

Figure 11:
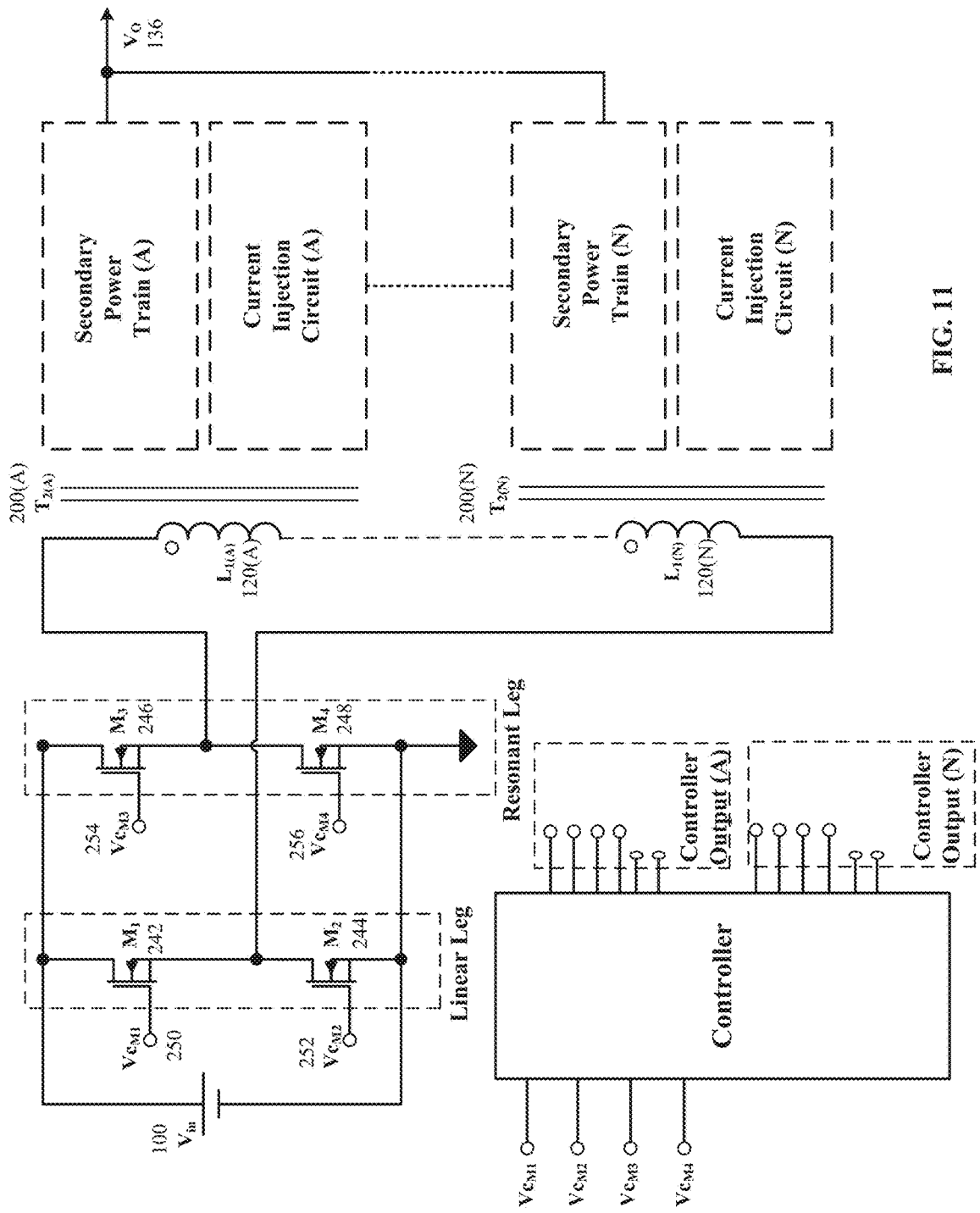
FIG. 11 is a schematic diagram of a phase-shifted full-bridge converter with a multitude of power trains and current injection, configured for very high power applications (from about 1 kW to about 10 kW)

The above-describe methodology is also suitable for very-high power applications (~multiple kW). FIG. 11, for example, provides a schematic of a very high-power converter configured with the use of a PSFB bridge topology. In applications where the output current is very high (corresponding, for example, to a 12V and several kW output), several transformers are used, and the primary windings may need to be arranged in series starting from L1 (A) to L1 (N), as shown in FIG. 11. The outputs of the secondary power trains (connecting at the node corresponding to Vo) are in parallel. Each transformer has its own winding judiciously configured for appropriate current injection. When the circuitry is so configured, the amplitude of injected current is proportionate the output current through each power train. A person of skill will readily appreciate that the idea of having several smaller transformers instead of one larger transformer has many advantages. One of these advantages manifests in that the synchronous rectifiers can be smaller (~have smaller footprints and occupy volumes that are substantially smaller than those of related art) and can be placed closer to the windings, thereby minimizing the parasitic inductances. The same applies to the current injection switchers. All control signals are delivered by a control electronic circuitry (shown in FIG. 11) that governs the driving signals for the primary switchers and the driving signals for each secondary power trains (from A to N), as well as the driving signals for the current injection circuits (from A to N).

Overall, this disclosure addresses a methodology of achieving zero voltage switching conditions across all primary switchers regardless of the loading conditions and regardless of the leakage inductance in the transformer. In contrast, in related art addressing a PSFB topology to-date, the leakage inductance in the transformer and its variations remained very important in order to achieve such ZVS. To differentiate the present embodiments from related art and to achieve the set goal, the leakage inductance was increased and, in some implementations, additional inductive elements were added in series with the winding. The methodology presented herein leads to desired zero voltage switching even with zero leakage inductance (which cannot be achieved with embodiments of related art).

A skilled artisan will also appreciate the operation of an embodiment of the present invention results in a situation when the voltage across the rectifiers means (such as synchronous rectifiers) does not have spikes and ringing. Such effect is achieved because the parasitic capacitance across the rectifier means are charged with a current source (as opposed to voltage sources with parasitic inductance in series), which can be magnetizing current or the sum of the magnetizing current and current injected into the circuitry with the use of an appropriate current-injection circuit. Accordingly, embodiments of the present invention eliminate the need of snubbers across the rectifiers means. (Typically, as known in related art, a snubber may include \a capacitor in series with a resistor. The capacitor is chosen to be several times higher in value than the parasitic capacitance across the switch and the resistor is tuned to create a critical damping reducing the spikes and the ringing.)

The ability to operate a phase shifted full bridge topology under zero voltage switching conditions regardless of the loading conditions and with very low (or even non-existent) leakage inductance causes the operation with very high efficiency, due to the fact that very efficient transformers have inherently a very low leakage inductance. The absence of ringing and spikes in voltage across the synchronous rectifiers lends the embodiments of the invention to be suitable for very high frequency operation and highly suitable with GaN technology for the switching elements. Using the technologies described in this invention, efficiency of 99% and even higher can be obtained. To exceed 99% efficiency for a DC-DC Converter, the efficiency of the transformer shall be higher than 99.4%-99.5%. This efficiency can be reached for magnetic structures with very low leakage inductance.

It is appreciated that described methodologies can also be applied to operation of other topologies (such as asymmetrical half bridges and asymmetrical full bridges, push pull, half bridges, and single ended and double ended forward topologies, as well as to any other derivation of forward derived topologies; center tap, and full bridge rectification circuitries).

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these term in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Other specific examples of the meaning of the terms "substantially", "about", and/or "approximately" as applied to different practical situations may have been provided elsewhere in this disclosure.

An embodiment of the system generally may include electronic circuitry (for example, a computer processor and/or controller) governing an operation of the embodiment and controlled by instructions stored in a memory, to perform specific data collection/processing and calculation steps as disclosed above. The memory may be random access memory (RAM), read-only memory (ROM), flash memory or any other memory, or combination thereof, suitable for storing control software or other instructions and data. Those skilled in the art should would readily appreciate that instructions or programs defining the operation of the present embodiment(s) may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement a method of the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

The invention as recited in claims appended to this disclosure is intended to be assessed in light of the disclosure as a whole. Various changes in the details, steps and components that have been described may be made by those skilled in the art within the principles and scope of the invention.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as being limited to the disclosed embodiment(s).

What is claimed is:

1. A method for operating a pulse-shifted full-bridge (PSFB) DC-DC converter, the converter comprising
a primary side and a secondary side;
a transformer having at least one primary winding at the primary side and at least one secondary winding at the secondary side; a leakage inductance formed between the at least one primary winding and the at least one secondary winding;
a bridge formed by two legs connected in parallel, one leg being a linear leg and another leg being a resonant leg,
wherein each leg is formed by corresponding bottom primary switching element and upper primary switching element at the primary side configured in a totem pole arrangement,
wherein common terminals of the two legs are connected to an input voltage source,
wherein shared terminals of switching elements within one leg, from the two legs, are connected to one end of the at least one primary winding and wherein shared terminal of the switching elements of another leg, from the two legs, are connected to another end of the at least one primary winding,
wherein switching elements of a given leg, from the two legs, are configured to be complementary to each other during operation of the converter with a period of dead time that includes driving signals from one leg to be phase-shifted with respect to driving signals from another leg;
first and second synchronized rectifiers at the secondary side;
at least one output inductor at the secondary side, wherein a first terminal of said at least one output inductor is connected to a load of the converter, wherein a second terminal of said at least one output inductor is directly connected to a synchronized rectifier from the first and second synchronized rectifiers;
and
electronic circuitry configured, as a controller, to generate control signals to the primary switching elements, the control signals having square waveforms;
the method comprising:
(a) Switching on an upper primary switching element of the resonant leg and a bottom primary switching element of the linear leg, said upper primary switching element of the resonant leg and the bottom primary switching element of the linear leg defining a first diagonal of the bridge and,
while the first synchronized rectifier is on, transferring power from the primary side to the secondary side, wherein said transferring is characterized by linearly changing, with time, a first amplitude of first current flowing through the at least one output inductor and linearly increasing a second amplitude of magnetizing current of said transformer to a peak value of the second amplitude;
(b) After switching off the bottom primary switching element of the linear leg and turning on the upper primary switching element of the linear leg, continuing the transferring power to the load and continuing the linearly changing of the amplitude, of current flowing through the at least one output inductor, to a lowest value of said first amplitude while maintaining the magnetizing current at the peak value;
(c) After switching off the upper switching element of the resonant leg, discharging a parasitic capacitance reflected across primary switching elements of the resonant leg, with the use of the leakage inductance;

(d) Switching off the first synchronized rectifier after the second amplitude exceeds the lowest value of the first amplitude to force a first current to flow into the at least one primary winding while continuing said discharging, wherein the first current is the magnetizing current reduced by a current through the at least one output inductor connected to the first synchronized rectifier;

(e) Cyclically repeating at least steps (a) through (c) with the use of the second synchronized rectifier and a second diagonal of the bridge, which is formed by the upper primary switching element of the linear leg and a bottom primary switching element of the resonant leg, and the second synchronized rectifier; and (f) switching off the first synchronized rectifier when the second amplitude exceeds the lowest value of the first amplitude during the entire period of said dead time to cause a linear discharge of voltage, across primary switching elements of the resonant leg, to reach zero.

2. The method according to claim 1, further comprising switching off the first synchronized rectifier when the second amplitude exceeds the lowest value of the first amplitude during the entire period of said dead time to cause a linear discharge of voltage across primary switching elements of the resonant leg to reach zero before an end of said the period of dead time.

3. The method according to claim 1, further comprising:
after switching off the upper primary switching element of the resonant leg, changing
i) an amount of negative current through the first synchronized rectifier, and
ii) a time delay to turn on the bottom primary switching element of the resonant leg to obtain zero voltage switching conditions,
wherein the time delay is a time period between a moment when a synchronized rectifier is switched off and a moment when a primary switching element is turned on.

4. The method according to claim 3, wherein said changing is carried out after the second synchronized rectifier is switched off.

5. The method according to claim 1, further comprising controlling the second amplitude of the magnetizing current by varying a frequency of the driving signals of the primary and secondary switching elements.

6. The method according to claim 1, wherein said operating includes operating the PSFB DC-to-DC converter the secondary side of which is arranged according to any of a) a center tap, b) a current doubler, and c) a full-bridge rectification configurations.

7. The method according to claim 1, wherein the operating is carried out in a continuous mode.

8. A method for operating a pulse-shifted full-bridge (PSFB) DC-DC converter, the converter comprising
a primary side and a secondary side;
a transformer having at least one primary winding at the primary side and at least one secondary winding at the secondary side; a leakage inductance formed between the at least one primary winding and the at least one secondary winding;
a bridge formed by two legs connected in parallel, one leg being a linear leg and another leg being a resonant leg, wherein each leg is formed by corresponding bottom primary switching element and upper primary switching element, at the primary side, configured in a totem pole arrangement,
wherein common terminals of the two legs are connected to an input voltage source,
wherein shared terminals of switching elements within one leg, from the two legs, are connected to one end of the at least one primary winding and wherein shared terminal of the switching elements of another leg, from the two legs, are connected to another end of the at least one primary winding,
wherein switching elements of a given leg, from the two legs, are configured to be complementary to each other during operation of the converter with a period of dead time that includes driving signals from one leg to be phase-shifted with respect to driving signals from another leg;
first and second synchronized rectifiers at the secondary side;
a first current injection source placed across the first synchronized rectifier, and a second current injection source placed across the second synchronized rectifier;
at least one output inductor at the secondary side, wherein a first terminal of said at least one output inductor is connected to a load of the converter, wherein the second terminal is directly connected to a synchronized rectifier from the first and second synchronized rectifiers;
and
electronic circuitry configured, as a controller, to generate control signals to the primary switching elements, and to control the current injection source, the control signals having square waveforms;
the method comprising:

(a) Switching on an upper primary switching element of the resonant leg and a bottom primary switching element of the linear leg, said upper primary switching element of the resonant leg and the bottom primary switching element of the linear leg defining a first diagonal of the bridge
while the first synchronized rectifier is on, transferring power from the primary side to the secondary side, wherein said transferring is characterized by linearly changing, with time, a first amplitude of first current flowing through the at least one output inductor and linearly increasing a second amplitude, of magnetizing current of said transformer, to a peak value of the second amplitude;

(b) After switching off the bottom primary switching element of the linear leg and turning on the upper primary switching element of the linear leg continuing the transferring power to the load and continuing the linearly changing of the amplitude, of current flowing through the at least one output inductor, to a lowest value of said first amplitude while maintaining the magnetizing current at the peak value;

(c) After switching off the upper switching element of the resonant leg, discharging a parasitic capacitance reflected across primary switching elements of the resonant leg, with the use of the leakage inductance; and (d) During the discharging of said parasitic capacitance, turning the first current injection source on with a time-delay after a moment of time when the upper primary switching element of the resonant leg is turned off;

(e) Switching off the first synchronized rectifier after a sum of the second amplitude and an amplitude of current injected by the first current injection source exceeds the lowest value of the first amplitude, to force a first current to flow into the at least one primary winding while continuing said discharging, wherein the first current is a current injected by the first current injection source reduced by a current through the at least one output inductor connected to the first synchronized rectifier;
(f) Cyclically repeating at least steps (a) through (e) with the use of the second synchronized rectifier and a second diagonal of the bridge, which is formed by the upper primary switching element of the linear leg and a bottom primary switching element of the resonant leg, and the second synchronized rectifier;
the method further comprising switching off the first synchronized rectifier while a sum of the magnetizing current and the current injected by the first current injection source exceeds an amplitude of the current through the at least one output inductor connected to the first synchronized rectifier during the entire period of said dead time, to cause a linear discharge of voltage across primary switching elements of the resonant leg to reach zero.

9. The method according to claim 8, further comprising:
after switching off the upper primary switching element of the resonant leg, changing
i) an amount of negative current through the first synchronized rectifier, and
ii) a time delay to turn on the bottom primary switching element of the resonant leg to obtain zero voltage switching conditions,
wherein the time delay is a time period between a moment when a synchronized rectifier is switched off and a moment when a primary switching element is turned on.

10. The method according to claim 9, wherein said changing is carried out after the second synchronized rectifier is switched off.

11. The method according to claim 8, further comprising:
controlling the second amplitude, of the magnetizing current, by varying a frequency of driving signals of the primary and secondary switching elements.

12. The method according to claim 8, further comprising:
varying amplitudes of currents injected by the first and the second current injection sources.

13. The method according to claim 8, wherein said operating includes operating the PSFB DC-to-DC converter the secondary side of which is arranged according to any of a) a center tap, b) a current doubler, and c) a full-bridge rectification configurations.

14. The method according to claim 8, wherein said operating is carried out in a continuous mode.

15. A method for operating a pulse-shifted full-bridge (PSFB) DC-DC converter, the converter comprising
a primary side and a secondary side;
a transformer having at least one primary winding at the primary side, at least one secondary winding at the secondary side, and first and second current injection windings at the secondary side, wherein a leakage inductance is formed between the at least one primary winding and the at least one secondary winding;
a bridge formed by two legs connected in parallel, one leg being a linear leg and another leg being a resonant leg, wherein each leg is formed by corresponding bottom primary switching element and upper primary switching element at the primary side configured in a totem pole arrangement,
wherein common terminals of the two legs are connected to an input voltage source,
wherein shared terminals of switching elements within one leg, from the two legs, are connected to one end of the at least one primary winding and wherein shared terminal of the switching elements of another leg, from the two legs, are connected to another end of the at least one primary winding,
wherein switching elements of a given leg, from the two legs, are configured to be complementary to each other during operation of the converter with a period of dead time that includes driving signals from one leg to be phase-shifted with respect to driving signals from another leg;
first and second current injection switching elements, each having corresponding first and second terminals,
wherein the first terminal of the first current injection switching element is connected to one end of the first current injection winding while another end of the first current injection winding is directly connected to a capacitor at a junction;
wherein the first terminal of the second current injection switching element is connected to one end of the second current injection winding while another end of the second current injection winding is directly connected to the capacitor at the junction;
wherein the second ends of the first and second current injection switching elements are directly connected to one another,
first and second synchronized rectifiers at the secondary side;
at least one output inductor at the secondary side, wherein a first terminal of said at least one output inductor is connected to a load of the converter, wherein the second terminal is directly connected to a synchronized rectifier from the first and second synchronized rectifiers;
and
electronic circuitry configured, as a controller, to generate control signals directed to said primary switching elements, first and second synchronized rectifier, and to said first and second current injection switching elements, said control signals having square waveforms;
the method comprising:
(a) Switching on an upper primary switching element of the resonant leg and a bottom primary switching element of the linear leg, said upper primary switching element of the resonant leg and the bottom primary switching element of the linear leg defining a first diagonal of the bridge; and
while the first synchronized rectifier is on, transferring power from the primary side to the secondary side, wherein said transferring is characterized by linearly changing, with time, a first amplitude of first current flowing through the at least one output inductor and linearly increasing a second amplitude of magnetizing current of said transformer to a peak value of the second amplitude;
(b) After switching off the bottom primary switching element of the linear leg and turning on the upper primary switching element of the linear leg, continuing the transferring power to the load and continuing the linearly changing of the amplitude of the first current to a lowest value of said first amplitude while maintaining the magnetizing current at the peak value;
(c) After switching off the upper switching element of the resonant leg, discharging a parasitic capacitance reflected across primary switching elements of the resonant leg with the use of the leakage inductance;
(d) Switching the first current injection switching element on;

(e) Switching off the first synchronized rectifier after a first sum, of the second amplitude and an amplitude of additional current injected into a current injection winding by the first current injection switching element, exceeds the lowest value of the first amplitude to force a first current to flow into the at least one primary winding while continuing said discharging, wherein the first current is a current represented by second sum, of the magnetizing current and the additional current, that is reduced by a current through the at least one output inductor connected to the first synchronized rectifier;

(f) Cyclically repeating at least steps (a) through (e) with the use of the second synchronized rectifier and a second diagonal of the bridge, which is formed by the upper primary switching element of the linear leg and a bottom primary switching element of the resonant leg, and the second synchronized rectifier;

wherein the method further comprises switching off the first synchronized rectifier while a sum of the magnetizing current and the current injected by the first current injection source exceeds an amplitude of the current through the at least one output inductor connected to the first synchronized rectifier during the entire period of said dead time, to cause a linear discharge of voltage across primary switching elements of the resonant leg to reach zero before.

16. The method according to claim 15, further comprising:

after switching off the upper primary switching element of the resonant leg, changing i) an amount of negative current through the first synchronized rectifier, and ii) a time delay to turn on the bottom primary switching element of the resonant leg to obtain zero voltage switching conditions, wherein the time delay is a time period between a moment when a synchronized rectifier is switched off and a moment when a primary switching element is turned on.

17. The method according to claim 15, further comprising:

controlling the second amplitude, of the magnetizing current, by varying a frequency of driving signals of the primary and secondary switching elements.

18. The method according to claim 15, further comprising:

varying amplitudes of currents injected into current injection winding by the first and second current injection switching elements by varying first and second current injection phase shifts, wherein the first current injection phase shift is a delay between a moment of turning on of the first current injection switching element and a moment of turning on of a bottom primary switching element of the resonant leg, wherein the second current injection phase shift is a delay between a moment of tuning on of the second current injection switching element and a moment of turning on of an upper primary switching element of the resonant leg.

19. The method according to claim 15, wherein said operating includes operating the PSFB DC-to-DC converter the secondary side of which is arranged according to any of a) a center tap, b) a current doubler, and c) a full-bridge rectification configurations.

20. The method according to claim 15, wherein said operating is carried out in a continuous mode.

* * * * *